United States Patent [19]

Ericsson

[11] Patent Number: 4,849,810
[45] Date of Patent: Jul. 18, 1989

[54] HIERARCHIAL ENCODING METHOD AND APPARATUS FOR EFFICIENTLY COMMUNICATING IMAGE SEQUENCES

[75] Inventor: S. Staffan Ericsson, Manchester, Mass.

[73] Assignee: PictureTel Corporation, Peabody, Mass.

[21] Appl. No.: 57,964

[22] Filed: Jun. 2, 1987

[51] Int. Cl.[4] .............................................. H04N 7/12
[52] U.S. Cl. ................................... 358/133; 358/136; 358/135
[58] Field of Search ............... 358/136, 133, 280, 284, 358/260, 135

[56] References Cited

U.S. PATENT DOCUMENTS

| | | | |
|---|---|---|---|
| T928,003 | 11/1974 | Bahl et al. | |
| 3,413,912 | 11/1968 | Townsend | 358/280 |
| 3,830,966 | 8/1974 | Aldrich et al. | |
| 4,091,424 | 5/1978 | Widergren | 358/260 |
| 4,150,401 | 4/1979 | Yamamoto et al. | 358/260 |
| 4,179,709 | 12/1979 | Workman | 353/133 |
| 4,222,076 | 9/1980 | Knowlton | 358/263 |
| 4,261,018 | 4/1981 | Knowlton | 358/263 |
| 4,276,544 | 6/1981 | Iinuma | |
| 4,302,775 | 11/1981 | Widergren et al. | 358/136 |
| 4,363,036 | 11/1982 | Subramaniam | 358/261 |
| 4,369,463 | 1/1983 | Anastassiou et al. | 358/135 |
| 4,371,895 | 2/1983 | Koga | 358/136 |
| 4,394,774 | 7/1983 | Widergren et al. | 382/56 |
| 4,420,771 | 12/1983 | Pirsch | 358/261 |
| 4,430,748 | 2/1984 | Tuhro et al. | 382/50 |
| 4,447,886 | 5/1984 | Meeker | 364/725 |
| 4,476,484 | 10/1984 | Haskell | 358/11 |
| 4,486,785 | 12/1984 | Lasher et al. | 358/284 |
| 4,528,693 | 7/1985 | Pearson et al. | 382/47 |
| 4,535,352 | 8/1985 | Haskell | 358/16 |
| 4,541,012 | 9/1985 | Tescher | 358/133 |
| 4,563,671 | 1/1986 | Lim et al. | |
| 4,574,379 | 3/1986 | Eng et al. | 370/104 |
| 4,578,704 | 3/1986 | Gharavi | 358/135 |

(List continued on next page.)

FOREIGN PATENT DOCUMENTS

0123456 10/1984 European Pat. Off.

OTHER PUBLICATIONS

Cohen et al, "Hierarchial Coding of Binary Images," *IEEE Transactions on Pattern Analysis and Machine Intelligence*, vol. PAMI-7, No. 3. May 1985, pp. 284–298.

Wilson, "Quad-Tree Predictive Coding: A New Class of Image Data Compression Algorithms," CH1945-5/84/0000-0312, 1984, *IEEE*.

Sabin et al, "Product Code Vector Quantizers for Waveform and Voice Coding," 0096-3518/84/06-00-0474, 1984, *IEEE*.

Primary Examiner—James J. Groody
Assistant Examiner—Victor R. Kostak
Attorney, Agent, or Firm—Hale and Dorr

[57] ABSTRACT

A method and apparatus for encoding interframe error data in an image transmission system, and in particular in a motion compensated image transmission system for transmitting a sequence of image frames from a transmitter to a receiver, employ hierarchial vector quantization and arithmetic coding to increase the data compression of the images being transmitted. The method and apparatus decimate an interframe predicted image data and an uncoded current image data, and apply hierarchial vector quantization encoding to the resulting pyramid data structures. Lossy coding is applied on a level-by-level basis for generating the encoded data representation of the image difference between the predicted image data and the uncoded original image. The method and apparatus are applicable to systems transmitting a sequence of image frames both with and without motion compensation. The method and apparatus feature blurring those blocks of the predicted image data which fail to adequately represent the current image at a pyramid structural level and shifting block boundaries to increase the efficiency of the vector quantization coding mechanism. The method further features techniques when gain/shape vector quantization is employed for decreasing the data which must be sent to the receiver by varying the size of the shape code book as a function of the gain associated with the shape. Thresholding and the deletion of isolated blocks of data also decrease transmission requirements without objectionable loss of image quality.

67 Claims, 8 Drawing Sheets

U.S. PATENT DOCUMENTS

| | | | |
|---|---|---|---|
| 4,580,162 | 4/1986 | Mori | 358/135 |
| 4,581,638 | 4/1986 | Chiariglione et al. | 358/135 |
| 4,583,237 | 4/1986 | Haskell | 375/27 |
| 4,589,110 | 5/1986 | Eng et al. | 370/118 |
| 4,593,318 | 6/1986 | Eng et al. | 358/142 |
| 4,598,372 | 7/1986 | McRoberts | 364/518 |
| 4,633,296 | 12/1986 | Cham et al. | 358/12 |
| 4,646,355 | 2/1987 | Petrick et al. | 358/284 X |
| 4,656,511 | 4/1987 | Koga | 358/136 |
| 4,661,849 | 4/1987 | Hinman | 358/136 |
| 4,663,660 | 5/1987 | Fedete et al. | 358/133 X |
| 4,695,882 | 9/1987 | Wada et al. | 358/136 |
| 4,700,226 | 10/1987 | Acampora | 358/136 X |
| 4,709,394 | 11/1987 | Bessler | 358/133 X |
| 4,745,473 | 5/1988 | Hall | 358/133 |

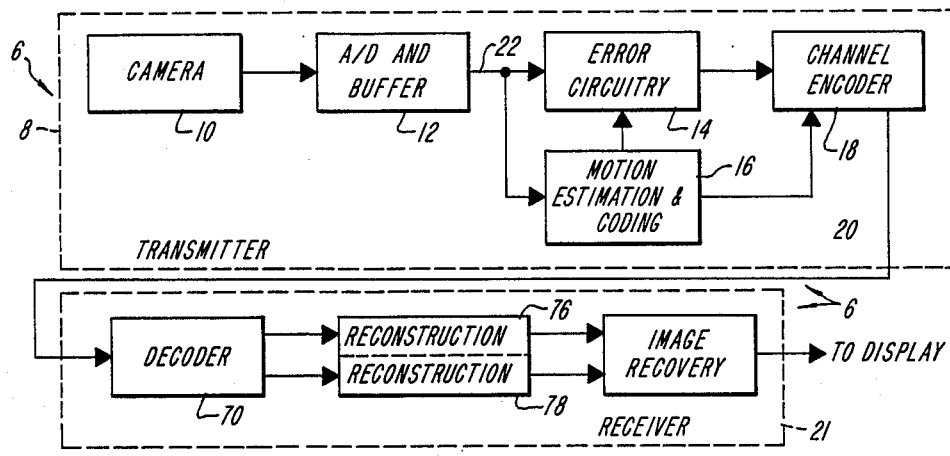
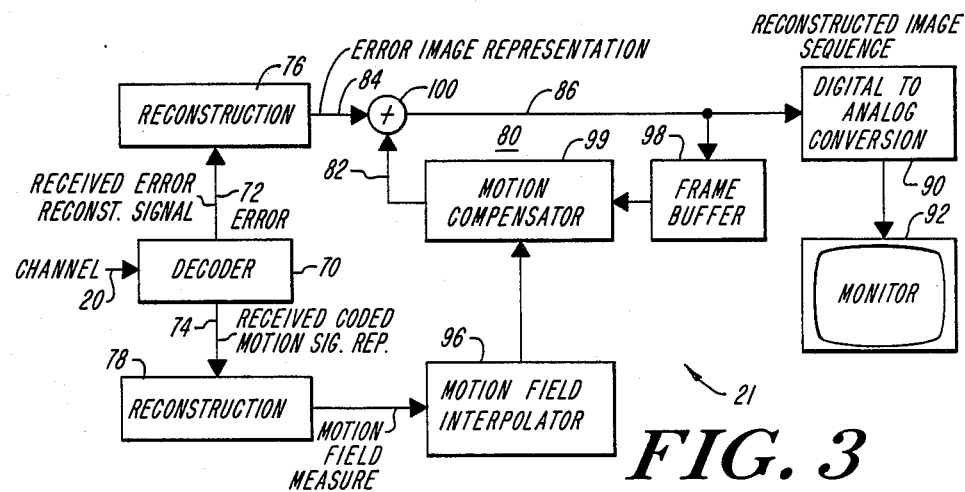
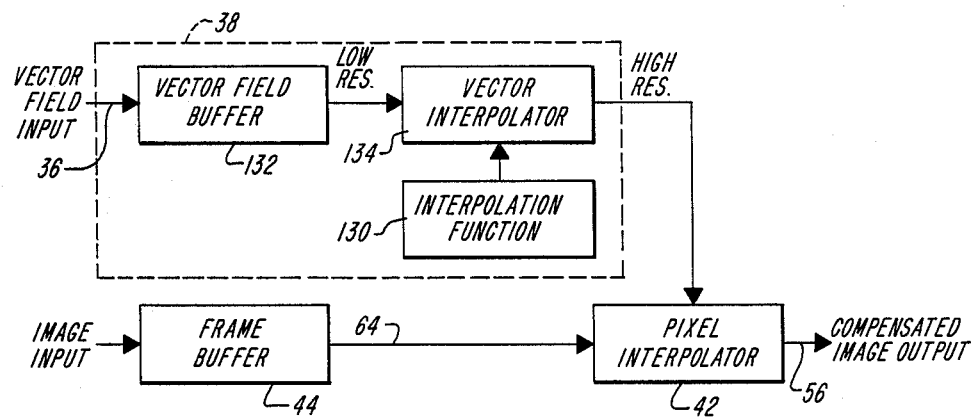

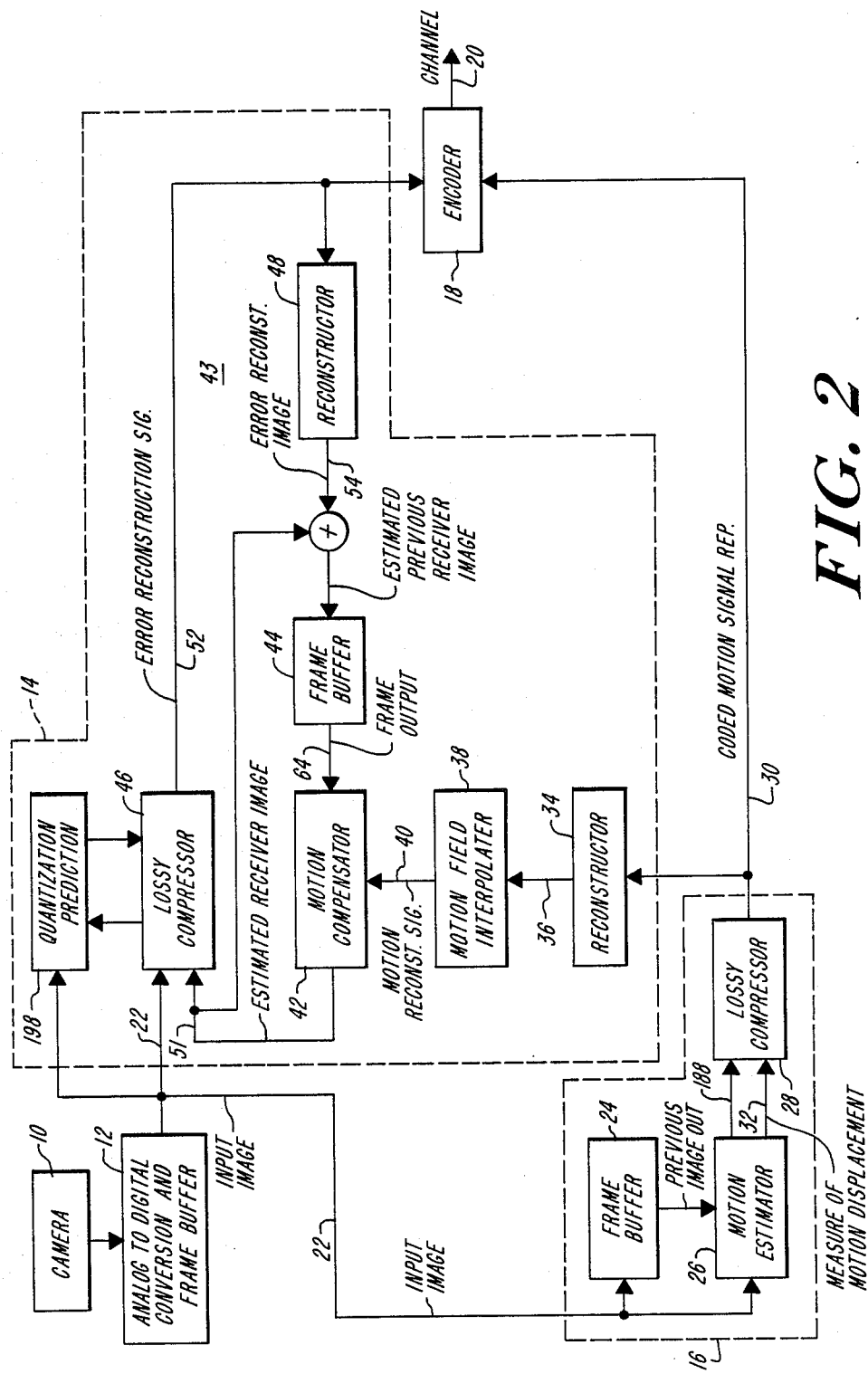

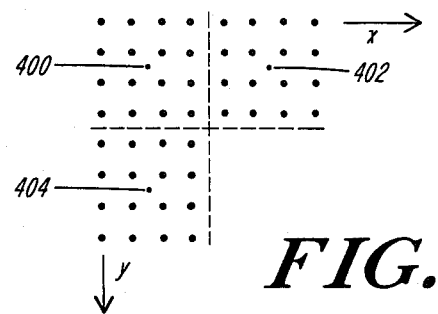
FIG. 5
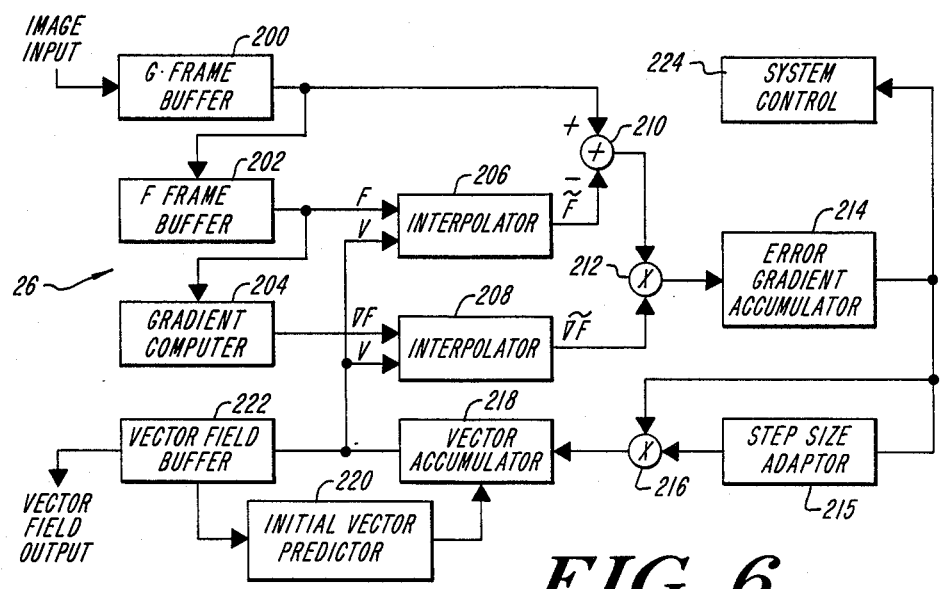
FIG. 6
FIG. 8

HIERARCHIAL ENCODING METHOD AND APPARATUS FOR EFFICIENTLY COMMUNICATING IMAGE SEQUENCES

BACKGROUND OF THE INVENTION

The invention relates generally to data communication and signal processing methods and apparatus, and in particular to a method and apparatus for reliably and efficiently encoding and decoding sequences of image data, for example, that transmitted over a telephone communications channel.

The transmission of sequences of images, and in particular sequences of naturally occurring images such as those represented by a television signal, has been the subject of a significant amount of investigation. Typically, investigators have relied upon the highly redundant nature of successive images in the sequence and have often modeled the image data as a Markov process with a correlation coefficient close to unity. The three-dimensional Markov model provides a motivation for utilizing differential pulse-code-modulation (DPCM) and transform coding techniques to take account of the interframe redundancy.

By analyzing the nature of typical moving video, it is easy to become convinced that the principal change occurring between successive frames is the inhomogeneous motion of the objects within the frame. It has also been recognized that an accurate apparatus and method of estimating and compensating for this spatially dependent motion enables the construction of an interframe data compression method and apparatus which can have substantially better performance than can be achieved by sending a signal representative merely of the difference between successive frames.

As a result, various motion compensating coding methods and apparatus have been developed. These systems typically are either receiver-based motion compensation systems or transmitter-based motion compensation systems. In the receiver-based motion compensation system, the receiver makes a prediction as to the motion and compensates the previous frame for the expected motion. The transmitter, operating in the same manner, then sends only an error signal describing what must be done at the receiver in order to correct the receiver predicted frame. The error signal is typically coded to reduce its bandwidth.

For a transmitter-based motion compensation system, the motion estimation process occurs only at the transmitter. Displacement vectors are generally determined over various regions of the image and this data is then transmitted to the receiver along with an error information data signal. At the receiver, the compensation process is performed on the previously coded image first using the motion information provided by the transmitter. The error signal data provided by the transmitter is then added to the thus compensated receiver image in order to maintain picture quality.

There is thus typically provided for a transmitter-based motion compensation system a plurality of displacement vectors, and in at least one preferred embodiment, each vector is associated with a specific region or block of the image. The blocks are typically non-overlapping and have, for example, a size of eight picture elements (pixels) by eight picture elements. Various methods have been employed for encoding the motion compensation data associated with each of the blocks. Hinman, in his co-pending application U.S. Ser. No. 740,898, filed June 3, 1985, the contents of which are incorporated herein, in their entirety, by reference, describes a lossy coding method for encoding the motion-compensation displacement information.

Many methods have also been employed for encoding the error information data signal in a transmitter-based motion compensation system. In the above-identified Hinman application, a lossy compression method and apparatus are disclosed. While these methods are highly advantageous, and provide excellent results, it is nevertheless desirable to further improve the compression of the data information and thereby enable high quality image reproduction using still less channel bandwidth. It is further desirable to provide better control over the data transmission by controlling, for example, the bit rate associated with the image.

Often, during a scene change, for example, there exists substantial information to be transmitted, so that during a single frame time, insufficient bandwidth is available to transmit all of the information. Accordingly, various methods have been implemented to selectively limit the number of bits of information transmitted over the channel. One of these methods, described in Ericsson, U.S. Ser. No. 001,326, filed Jan. 7, 1987, entitled "A Method and Apparatus for Efficiently Coding and Decoding Image Sequences," employs quad-tree coding in connection with the transmission of portions of a transform coefficient data set. The quad-tree coding advantageously provides a more graceful degradation of the image during heavy motion or scene changes. The contents of the Ericsson, U.S. Ser. No. 001,326, filed Jan. 7, 1987, are incorporated herein, in their entirety, by reference.

It is therefore an object of the present invention to transmit sequences of images over a communications channel using relatively low bandwidth, and providing high reliability and fidelity. Another object of the invention is to control the number of bits employed to transmit each image of a sequence of images while providing for graceful degradation of the image during a scene change or during periods of heavy motion. Other objects of the invention are a motion compensation encoding and decoding method and apparatus which reliably transmit and receive an accurate estimate of the displacement of the pixels of a scanned image in a sequence, and an improved motion estimation encoding and decoding method and apparatus which enable real-time, accurate determination of regional displacement in an image transmission device.

SUMMARY OF THE INVENTION

The invention relates to a method and apparatus for encoding interframe error data in an image transmission system, and in particular, in a motion compensation image transmission system, for transmitting a sequence of image frames from a transmitter station to a receiver station. The method features the steps of decimating an interframe predicted image data representing a prediction of the current image frame for generating a prediction pyramid data structure representing the current image prediction and having a plurality of decimation levels; decimating an uncoded current image data representing the current uncoded image frame for generating a current image pyramid data structure representing the current image and having the plurality of decimation levels; and applying a hierarchical vector quantization encoding method to the prediction and current image pyramid data structures, on a level by level basis, for generating an encoded data representation of the difference between the predicted image data and the uncoded current image data.

In other aspects, the method features the steps of applying the hierarchical encoding method to the data structures of a level on a block-by-block basis and blurring blocks of the predicted image representation when a predicted image data fails to adequately represent that block portion of the original image. The method further features shifting block location boundaries from frame to frame of the sequence of image frames for improving the encoding efficiency. The method further features the step of employing arithmetic coding for generating, in part, the encoded representation.

In yet another aspect of the invention, the method features applying lossy compression hierarchical encoding to the prediction and current image data structures on a level-by-level basis for generating the encoded data representation of the difference between the predicted image data and the uncoded current image data. The applying step features the step of interpolating, for at least one lower level, the image data from a higher level.

In another aspect of the invention, the method features the steps of forming a difference image representing, on a pixel-bypixel basis, the difference between a predicted image data for a current image frame and an uncoded current image data representing the uncoded current image frame. The method further features decimating the difference image for generating a difference image pyramid data structure having a plurality of decimation levels and applying hierarchical vector quantization encoding to the difference image pyramid data structure on a level-by-level basis for generating an encoded data representation of the difference between the predicted image data and the uncoded current image data. In a particular aspect, the method features forming the predicted image data using interframe motion compensation.

In yet another aspect of the invention, the method relates to encoding data represented as a multi-dimensional array of data values and features the steps of quantizing said data values by applying gain/shape vector quantization coding and deleting all small non-zero gain values having a zero value for each of its nearest neighbors The method in another aspect features applying gain/shape vector quantization to blocks of the array of data values for encoding the values, and varying the size of a shape code book for the vector quantization as a function of the gain associated with the shape.

The apparatus of the invention features circuitry for decimating the interframe predicted image data for a current image frame for generating the prediction pyramid data structure having a plurality of decimation levels, circuitry for decimating the uncoded current image data representing the current uncoded image frame for generating a current image pyramid data structure having the plurality of decimation levels, and circuitry for applying hierarchical vector quantization encoding to the prediction and current image pyramid data structures on a level-by-level basis for generating an encoded data representation of the difference between the predicted image data and the encoded current image data. The apparatus further features circuitry for applying the hierarchical encoding method to the data structures of a level on a block-by-block basis and circuitry for blurring blocks of the predicated image representation when a predicted image data fails to adequately represent that block portion of the original image. In other aspects, the apparatus features circuitry employing arithmetic coding for generating, at least in part, the encoded representation; and circuitry for shifting block boundary locations from image to image in the sequence of image frames for improving the encoding efficiency.

In another aspect, the apparatus further features circuitry for applying lossy compression hierarchical encoding to the prediction and current image pyramid data structures on a level-by-level basis for generating the encoded data representation of the difference between the predicted image data and the encoded current image data. The applying circuitry features elements for interpolating, for at least one lower level, the image data from a higher level.

In yet another aspect of the invention, the apparatus for encoding the interframe error data in an image transmission system for transmitting a sequence of image frames features circuitry for forming a difference image representing, on a pixel-by-pixel basis, the difference between predicted image data for a current image frame and an uncoded current image data representing an uncoded image frame. Decimation circuitry is provided for decimating the difference image; for generating a difference image pyramid data structure having a plurality of decimation levels; and for applying a hierarchical vector quantization encoding to the difference image pyramid data structure on a level-by-level basis for generating an encoded data representation of the difference between the predicted image data and the encoded current image data.

BRIEF DESCRIPTION OF THE DRAWINGS

Other objects, features, and advantages of the invention will appear from the following description of particular preferred embodiments taken together with the drawings in which:

FIG. 1 is an electrical block diagram of a typical image communications system in accordance with the claimed invention;

FIG. 2 is an electrical block diagram of the transmitter of a motion-compensated image encoding apparatus employing the invention;

FIG. 3 is an electrical block diagram of the receiver of a motion-compensated image encoding system for receiving the channel signals from the transmitter of FIG. 2;

FIG. 4 is an electrical block diagram of a motion-compensation apparatus for a field of undersampled motion vectors;

FIG. 5 is a diagrammatic representation of a spatial interpolation process;

FIG. 6 is an electrical block diagram of an iterative spatial-domain motion estimation apparatus utilizing adaptive, steepest descent error minimization;

FIG. 8 is a diagrammatic presentation of the relative locations of adjacent blocks used in predicting an initial displacement motion vector value;

DESCRIPTION OF PARTICULAR PREFERRED EMBODIMENTS

Figure 7:
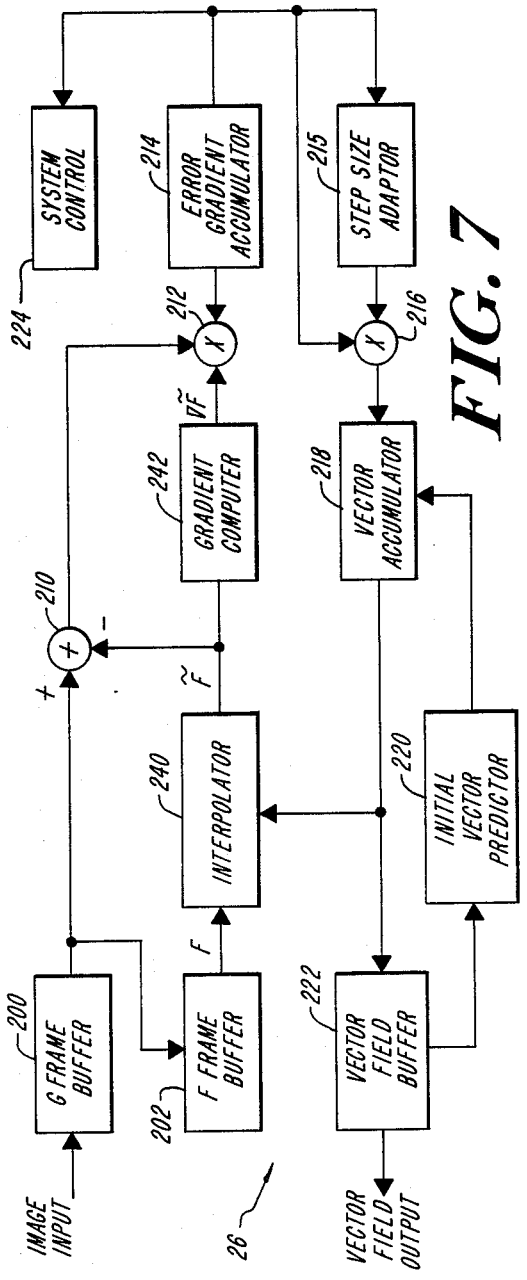
FIG. 7 is an electrical block diagram of an iterative spatial-domain motion estimation apparatus utilizing adaptive, steepest descent error minimization with an improved data processing structure.

Referring to FIG. 1, a communications system 6 has a transmitter 8 which, in accordance with a preferred embodiment of the invention, has a camera 10 for providing a video signal to an analog-to-digital converter and frame buffer 12. The frame buffer portion of the analog-to-digital converter and frame buffer 12 is capable of storing a full frame of the video, sampled to, for example, eight bits across a 256×240 pixel raster.

The entire coding and motion compensation process takes place in the digital domain. The transmitter has an error signal circuitry 14 and a motion estimation and coding circuitry 16. A channel encoder 18 channel encodes the outputs of the error circuitry 14 and motion estimation and coding circuitry 16 and passes the thus encoded data onto a channel 20 for transmission to a receiver 21.

The illustrated motion estimation and coding circuitry 16 of FIG. 1, in accordance with a preferred embodiment of the invention, and referring to FIG. 2, compares a present original input frame image, available over lines 22, with the previous original input image, available in this illustrated embodiment from a frame buffer 24. A motion estimator circuitry 26 generates a measure of the motion displacement between the frames input thereto, and can be any of a number of motion estimation devices as are well known in the art. In a preferred embodiment to be described hereinafter, the motion estimation device uses an adaptive steepest descent error minimization method to generate the motion displacement measures as described in Hinman, U.S. Pat. No. 4,661,849, the contents of which are incorporated herein, in their entirety, by reference.

The output of the motion estimator 26 is a field of motion vectors which, as noted above, provide a measure of the motion displacement between input frames. This vector field provides a description of how to map a previous input frame or input image from buffer 24 into the best approximation of the present input frame or image over lines 22. By "best" is meant an error metric such as, for example, a mean-squared-error error measure. Typically, and in the illustrated embodiment, the motion estimator uses a region matching technique between non-overlapping blocks of the previous and present input images. Should motion occur for a region in the present image, the estimator will determine which block in the previous image is the best match for the block in the previous image, and the value of the displacement is the difference between a new coordinate pair for the block in the present image and the original coordinate pair for the block in the earlier image. That determination defines the motion vector to be associated with the block in the present image.

Since scenes are generally composed of several large objects moving uniformly over time, there is a high degree of correlation in the motion vector field. To avoid transmitting redundant information, and to reduce the data bit requirements, the preferred embodiment of the invention modifies the motion vector field, thereby losing some information, to facilitate the compression of the motion representing data. In the illustrated embodiment, this operation is represented by a "lossy compressor" 28 which reduces the amount of data, and hence the bandwidth, required to represent the motion vector field. Noting the similarity between motion vector field and natural images, predictive, transform, or interpolative coding of the two independent components of the vector field can be employed by the lossy compressor 28.

Thus the lossy compressor circuitry 28 is employed for coding the motion vector field available over lines 32, and provides, over lines 30, a coded motion signal representative of the motion vectors. This output of the lossy compressor, as noted above, will not, upon decoding, exactly reproduce the signals over lines 32 (which provide the measure of motion displacement) and, therefore, have some error signal associated with them. Nevertheless, the reduction in the data requirements of a lossy compressor, when compared to, for example, a PCM exact coding method, are so substantial, that the use of a lossy compressor, is a significant advance in the art. One preferred lossy compression circuitry employs a discrete cosine transform and the circuitry incorporates a processing method described in co-pending application, U.S. Ser. No. 740,806, entitled "Method and System for Adapting a Digitized Signal processing System for Block Processing With Minimal Blocking Artifacts" and filed on June 3, 1985. The inventor is Henrique Malvar. That application, assigned to the assignee of the present application, is incorporated herein, in its entirety, by reference.

The lossy compressor circuitry 28, in the illustrated embodiment of the invention, provides for block transformation and includes additional circuitry for reducing the number of bits (the bandwidth) required to describe the transformed motion vector field. The lossy compressor can thus provide for varying the quantization step size (and, if necessary, the threshold) with which the transform coefficients which define the motion vector field are "digitized," thereby reducing the number of output bits as either the quantization step size or the threshold (or both) increase in value. The lossy compressor also preferably employs arithmetic coding which is applied to the transform coefficients modeled as a Markov Process. This encoding method provides a substantial reduction in output bits, over, for example, the output of the system described in the co-pending application of Hinman, Ser. No. 740,898, entitled "A Method and Apparatus for Efficiently Communicating Image Sequences," filed June 3, 1985. That application, assigned to the assignee of the present application, is incorporated herein, in its entirety, by reference.

The output of the lossy compressor circuitry over lines 30, as noted above, is passed to the encoder 18. In addition, those signals are employed by the error circuitry 14 for determining what the receiver would have seen, absent any errors in the channel, and thereby providing the mechanism for determining the prediction error signal, that is, the signal representing the difference between what the receiver would have predicted based upon the coded motion signal representation over lines 30, and the true image input.

The output of the lossy compressor over lines 30 is used by a reconstructor circuitry 34 for producing, at its output, a signal representative of the measure of motion displacement, the motion vectors, on lines 32. The difference between the signals over lines 36, the output of the reconstruction circuitry, and the signals over lines 32, represents the coding error introduced by the lossy compression apparatus 28. The output of the reconstruction apparatus 34, over lines 36, is directed to a motion field interpolation circuitry 38 which operates in the spatial domain to associate with each picture element a motion displacement vector. Thus, while the input signals over lines 36 represent motion displacements for groups or regions of elements, for example, the picture elements of a 4×4 block, the motion field interpolator, as described in more detail below, resolves that data so that there is associated with each picture element, a motion displacement vector. The resulting output of the motion field interpolator, over lines 40, is designated the motion reconstruction signal.

The motion reconstruction signal is applied to a motion compensation apparatus 42 which forms part of an error reconstruction loop 43. The error reconstruction loop includes a frame buffer 44, a lossy compression circuitry 46, and a reconstruction circuitry 48. The inputs to the lossy compression circuitry 46, over lines 22 and 51 respectively, are the original input image for the current frame and the estimated receiver signal, that is, the signal which, absent any further data, the receiver will reconstruct and display. The lossy compressor 46 provides the receiver with further encoded data, the error reconstruction signal, for reducing, and in principle eliminating, the difference between the original input image and the estimated receiver signal. That difference is coded to reduce its bandwidth and the resulting signal, the error reconstruction signal over line 52, is delivered to the channel encoder 18. The lossy compressor 46 in the above referenced Ericsson patent application is a two-dimensional block encoder which employs a quantizer having a uniform quantization step size; and the output of the block transform can be advantageously further reduced in bandwidth and encoded according to the processes described above in connection with the lossy compressor 28. However, in the preferred and illustrated embodiment of the invention a hierarchical vector quantization encoding method and apparatus are advantageously employed in implementing the lossy compressor 46.

The error reconstruction signal is also sent to the reconstruction apparatus 48 which provides an operation which is the inverse to that imposed by the lossy compressor 46. There results, therefore, at the output of the reconstruction apparatus 48, an error reconstruction image over lines 54. The error reconstruction image is added to the expected output of the motion compensator, (which is the estimated receiver image over lines 51) and the resulting signal, an estimated previous receiver image (the predicted receiver image for the previous frame), is stored in the frame buffer 44.

As noted above, the input to the frame buffer 44 is the estimated previous receiver image. This receiver image, which takes into account all data received by the receiver, corresponds to the reconstructed receiver image for a frame. The image output from the frame buffer over lines 64 is the image which the motion compensation circuitry 42 modifies in accordance with the output of the motion field interpolator 38 over lines 40. The output of motion compensator 42 thus represents the predicted receiver image as a result of reconstructing the output data from lossy compressor 28.

At the receiver 21, referring to FIG. 3, the data from the channel is decoded by a channel decoder circuitry 70 and the resulting receiver error reconstruction signal over lines 72 and receiver coded motion signal representation over lines 74 are delivered to reconstruction circuitry 76, motion compensator 99, and reconstruction circuitry 78 respectively. The reconstruction circuitries 76 and 78 each provide for decoding the codes employed by the transmitter to effect the operations performed by reconstruction circuitries 48 and 34, respectively, of the transmitter, as described in more detail hereinafter. The output of the error reconstruction circuitry 76 is delivered to a recovery loop 80 in which motion compensating signals over lines 82 are added to the error image representation over lines 84 to produce a reconstructed receiver signal over lines 86. That signal is delivered to a digital-to-analog circuitry 90 and from there to a monitor 92 for viewing.

Motion reconstruction signals are generated by a motion field interpolator 96 corresponding to the motion field interpolator 38 of the FIG. 2. The motion field interpolator, as noted above, provides a motion vector for each picture element of the image and hence allows the frame interpolator to accurately predict what the image would have been at any selected time between received frames. The reconstructed receiver images over lines 86 are successively stored in a frame buffer 98 and are delivered to a motion compensator 99 which also receives signals from the motion field interpolator 96. The output of the motion compensator, representing the expected receiver image in the absence of an error correction, corresponds to the signal over lines 51 in the transmitter, and is delivered to the adder 100 for combination with the output of the error reconstruction circuitry over lines 84.

The transmitter and receiver circuitries of FIGS. 2 and 3 can be modified in a number of ways as described, for example, in co-pending applications Ser. No. 740,898 and 001,326 referred to above. While these alternate embodiments of transmitter and receiver structure are applicable in different communications configurations, the invention described and claimed herein relating to a hierarchical coding system is not dependent upon which of those particular transmitter configurations is employed and will therefore be described solely in connection with the typical transmitter and receiver configuration set forth hereinabove.

The Motion Field Interpolator (38, 96)

Referring to FIG. 4, the motion field interpolator 38 receives from the reconstruction circuitry 34, a motion displacement vector over lines 36 for each block region of the image. For example, for a color television video signal, a typical luminance image can have a block size of 8×8 pixels while a typical chrominance image can have a block size of 4×4 pixels. The motion field interpolator, employing a selected interpolation method, then associates with each pixel of the frame, an interpolated motion vector displacement value.

In accordance with the preferred aspect of the invention, a raised cosine interpolation function is employed for associating with each pixel a displacement value. The interpolation function is stored at 130. The input vector field is stored in a buffer 132 and has a low resolution corresponding to the block size.

Thus, in accordance with this aspect of the invention, each displacement vector from reconstruction circuitry 34 is associated with the center of a multi-pixel region. Thus, for a 4×4 block region, referring to FIG. 5, the interpolation vectors are associated with a center position, that is, positions 400, 402, 404 which are not, for a 4×4 block, associated with any one picture element.

The interpolation process, performed by a vector interpolator 134 (FIG. 4) operates in both the X and Y directions. Thus, the 2D displacement vector associated with the 4×4 pixel block region centered at 400 and the corresponding displacement vector associated with the region centered at 402, for example, can be interpolated with respect to the X direction, while the displacement vectors at regions centered at 400 and at 404 can be employed with respect to a Y interpolation. In general, the interpolation process employs a plurality of displacement vectors surrounding a point of interest for deriving the value of the displacement vector at the point. Thus, an X and Y interpolated displacement vector value is assigned by the vector interpolator 134 in accordance with the interpolation function being used for each pixel of the image. In other embodiments of the invention, interpolation functions other than the raised cosine can be employed. For example, a linear interpolation function, or a trapezoidal shaped interpolation function can be employed, the latter for reducing the computational load.

The output of the transmitter motion field interpolator 38, or the receiver motion field interpolator 96 (which operates in a manner identical to that of interpolator 38), is directed to the full motion compensation circuitry 42 in the transmitter and to the full motion compensation circuitry 80 in the receiver. The full motion compensation circuits 42 and 80, using incoming frame image data from frame buffers 44 and 98 respectively and the motion field interpolator output data, effect, in the transmitter, generation of the estimated receiver image over lines 51, and in the receiver, the received estimated image over lines 82. The motion compensation circuitry maps each output pixel location to a location in the previous frame as indicated by the displacement vector value associated with that output pixel location. The displacement vectors are specified by the motion field interpolation circuitry associated therewith. In particular, referring to FIG. 4, this is the output of vector interpolator 134.

There results, however, for some coordinate locations of the new image field, a mapping from pixel coordinates in the previous frame which do not fall upon a grid location. That is, the interpolated motion displacement vector may call for a movement of, for example, 1¼ picture elements. In these instances, the motion compensation apparatus employs a spatial (or pixel) interpolation, for example a linear spatial interpolation of the 2×2 block of pixels surrounding the noninteger location, for determining a pixel value from the previous frame. Other interpolation functions could, of course, be employed, for example, the value selected for the noninteger coordinate of the previous frame can be the value of the pixel closest thereto. Alternately, a raised cosine interpolation function can be employed.

The motion field interpolator 38 and motion compensator 42 can be implemented in hardware, in software, or in a combination of hardware and software. Attached hereto as Appendix B is a software implementation of a color video signal processing apparatus wherein the luminance (8×8 block regions) and chrominance (4×4 block regions) signals are processed.

The Lossy Compressor (28)

In accordance with a preferred embodiment of the invention, the lossy compression circuitry 28 employs a block transform encoding method for coding the motion estimation output signal.

The output of the motion estimation circuitry 26 has the appearance, in essence, of a highly correlated image wherein each picture element represents not a portion of a visual image but, rather, a displacement value.

In the illustrated embodiment of the invention, the lossy compression circuitry 28 employs a discrete cosine transform. Circuitry 28, then, for example, operates on the displacement vector output of the motion estimation circuitry 26 to provide coefficient data which is then adaptively subjected to a threshold and uniform quantization process. In this circumstance, the reconstruction circuitry 34 then employs the inverse discrete cosine transform as is well known in the art.

In yet another aspect of the invention, and as described the above-noted co-pending application U.S. Ser. No. 740,806, filed in the name of Henrique Malvar, on June 3, 1985, and assigned to the assignee of this invention, preprocessing techniques can be employed for improving even more upon the transform method described hereinabove, to substantially eliminate the block coding artifacts. In still another embodiment of the invention, the lossy compressor can be implemented using a short-space Fourier transform, such as that described in U.S. application Ser. No. 713,478, filed on March 19, 1985, for a Method and Apparatus for Multi-Dimensional Signal Processing Using a Short-Space Fourier Transform, and assigned to the assignee of the present invention. The disclosure and specification of the above identified U.S. Pat. Applications are incorporated herein, in their entirety, by reference.

Figure 9:
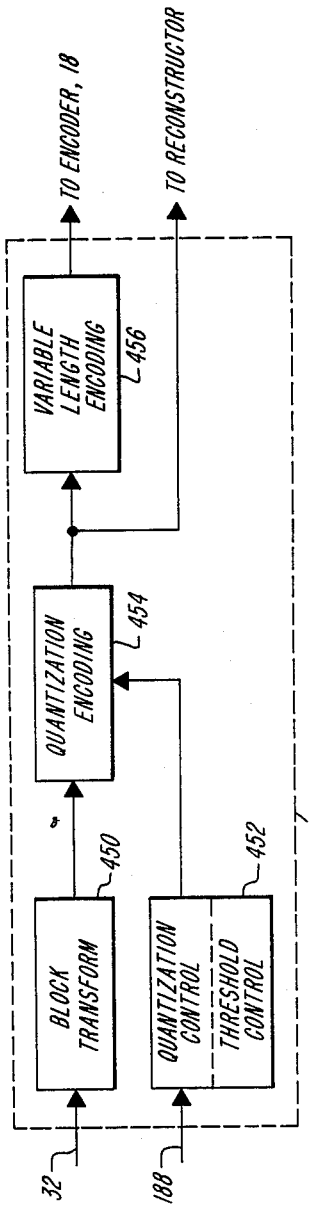
FIG. 9 is a block diagram of the lossy compressor 28 according to the invention.

The lossy compression circuitry 28 contains data bandwidth compression elements for controlling and reducing the bit rate output applied and directed to the channel encoder 18. Referring to FIG. 9, in accordance with the preferred embodiment of the invention, and examining the lossy compressor 28 in detail, the block transformation 450 to which the input to the lossy compressor is subjected, provides that each block in a spatial domain be transformed into an array of transform coefficients (some or all of which may be zero). Those coefficients are then quantized, and if necessary subjected to a thresholding process to further reduce the number of non-zero coefficients. In accordance with the invention, an increased threshold value and/or an increased quantization step size, reduces the number of non-zero coefficients to be coded and further reduces the length of the code words required to describe the coefficients output by the block transform method.

In accordance with the preferred embodiment of the invention, the quantization step size for a frame is advantageously predicted prior to the encoding of the frame. A quantization prediction and control 452 is employed by the lossy compressor 28, in response to the energy in the motion signals as provided from motion estimator 26 over lines 188.

Using the predicted quantization step size, the lossy compressor encodes, at 454, the remaining block transform coefficients using, for example, an arithmetic coding technique. This technique, known in the facsimile art, is implemented to efficiently code the locations of the non-zero coefficients. The apparatus variable length codes at 456, again using the arithmetic coding technique, the quantized non-zero array coefficient values to be transmitted, and provides the variable length code data to the channel encoder 18. (The lossy compressor then provides the quantizer encoded data to the reconstructor and all arithmetic encoded data only to the channel encoder.)

In operation, the coefficients of each transformed block selected to be updated are quantized using the predicted quantization step size, subject to initial thresholding; and thereafter, the coefficient array locations are coded. The compression process thus consists of several operations: quantization, reconstruction, code word generation, and bit stream generation. The quantization, reconstruction, and code word generation are, in the illustrated embodiment, performed together.

For each transform coefficient associated with a block, the coefficient value is, as noted above, subjected to a threshold cutoff value and then quantization. The quantizer employed herein is a uniform quantizer, and the threshold and quantizer step size can be determined as noted above. A typical threshold is 1.5 times the quantization step size and the expected peak to peak value of the signal to be quantized is, in the illustrated embodiment, divided into 256 equal steps. Each transform coefficient is first compared to the threshold value. If the value of the coefficient is greater than the threshold value (either positive or negative), then the coefficient is quantized and coded. If the value is below the threshold value, then the coefficient is set to zero and is not coded.

For the coefficients which are quantized, the value of the coefficient is multiplied by the inverse step size. If the resulting quantization value is, in the illustrated embodiment, greater than eight bits, the coefficient value is cut off to be the largest allowable eight bit value ($+127$ or $-128$ in the illustrated embodiment). This value is then used as an input for arithmetic encoding at the transmitter for deriving the transmitter variable length code word. The eight bit code word value is also used at the transmitter to reconstruct the transform coefficient. The quantized coefficient value is multiplied by the step size and will be made available to the associated reconstructor for each transmitted block. In the illustrated embodiment, the same threshold and quantizer step size is used for all coefficients associated with an image frame. In addition, probability estimates are used for all coefficients of a frame.

The quantization of each transform coefficient is performed at 454 as part of the overall coding process. The code words identify the transform array location to which each of the transmitted amplitude code words corresponds.

As noted above, the lossy compressor provides for limiting the number of bits in each frame to a constant level. In view of the use of a variable length code, as described hereinafter, it is not possible to exactly predict the number of generated bits and the problem thus is not "trivial." The traditional approach of collecting the bit stream in a buffer and preventing overflow or underflow of the buffer by a feedback configuration has associated therewith a disadvantageously long buffer delay time. In accordance with the preferred embodiment of the invention, the predetermined number of bits is approximated by predicting the quantizer step size dependent upon the motion frame energy.

The prediction of quantization step size, the encoding, and the decoding, can be implemented in hardware, in software, or in a combination of the two. Attached hereto as Appendices D, E, and F respectively, are software implementations of the methods.

The Lossy Compressor (46)

As noted above, the lossy compressor 46 receives as inputs the original uncoded signal over line 22 and signals representing the estimated receiver image over lines 51. The lossy compressor 46 uses those signals for encoding the difference between them, and outputs the encoded error reconstruction signal over lines 52. This signal corrects for most errors not properly compensated for by the motion compensation system. In the preferred embodiment of the invention a hierarchical vector quantizer coding method and apparatus is employed; however, in other embodiments other hierarichical methods employing a decimated pyramid structure and interpolation, as described below, can be employed.

Figure 10:
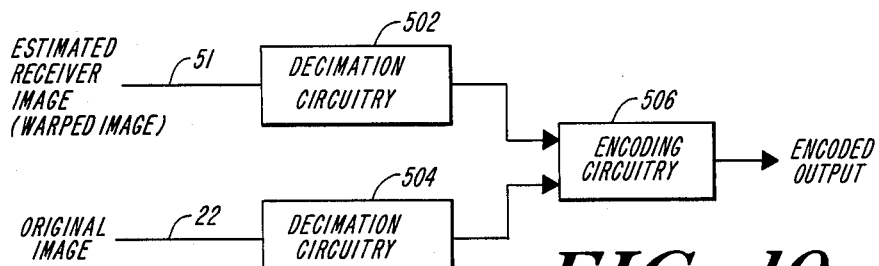
FIG. 10 is a block diagram of the lossy compressor 46 according to the invention.

Referring now to FIG. 10, the estimated receiver image over line 51 (often referred to as the "warped" image) and the original uncoded image over lines 22 are decimated (that is, filtered and subsampled as described below) by decimation circuitries 502, 504, respectively, four times. At each decimation stage, the image is subsampled by a factor of two both horizontally and vertically. Thus, five levels of images for the luminance image are available at resolutions of, in the illustrated embodiment, $256 \times 240$, $128 \times 120$, $64 \times 60$, $32 \times 30$, and $16 \times 15$ picture elements for the luminance. The set of images, at the different image resolutions, is commonly referred to as a "resolution pyramid." The base of the pyramid is the full resolution image while the top of the pyramid is, in the illustrated embodiment, the $16 \times 15$ pixel image.

Similar resolution pyramids are formed for the "I" and "Q" chrominance components of a color image. However, for the discussion below, only the luminance component of the image shall be discussed. The same apparatus and processing steps are equally applicable to the chrominance components of the image.

In accordance with the hierarchical system, encoding of the image difference between the warped image and the original uncoded image is performed by an encoding circuitry 506 on a level by level basis, from the top level to the bottom level of the resolution pyramids. The process terminates at that resolution when no additional bits are available for video transmission. Thus, during a moderate motion the system will typically reach the bottom or base level of $256 \times 240$ pixels while during a heavy motion the encoding may stop at the $128 \times 120$ level. Typically, during a scene change, the apparatus will run out of transmission bits earlier in the pyramid. Thus, in general, large changes of image or scenes are typically described first at the higher levels with the details being filled in in later frames.

More particularly, in accordance with a preferred hierarchical coding system using vector quantization, encoding begins at the top level, that is, the $16 \times 15$ image. The $16 \times 15$ version of the warped image is used as the prediction. Recall that this corresponds to the image (decimated) that is created at the receiver absent any additional information. This top level prediction is subtracted from the $16 \times 15$ decimated top level image of the original image. The difference image, representing the error at that top level, is quantized and the quantized information is directed to the encoder 18 for transmission to the receiver. Thereafter, the quantized difference image is added to the prediction image, at the 16×15 level, to form a 16×15 reconstructed image which the receiver will also create.

At the lower levels, the prediction version of the image is formed in a different fashion. In accordance with the invention, the prediction is derived from the higher level reconstructed image and from the current level warped image as follows.

First, an interpolation error image is derived by interpolating the higher level warped image and subtracting it from the current level warped image. The resulting warped interpolation error image thus essentially extracts the spatially higher frequencies of the warped image, that is, information not present in the higher level image. The higher level reconstructed image is then interpolated to form an interpolated, reconstruction image at the current level. Finally, the warped interpolation error image is adaptively added to the interpolated reconstruction image to generate the prediction image. However, as described below, the warped interpolation error image is used where it improves the prediction but not otherwise. This is decided on a block-by-block basis, and the decisions are transmitted to the receiver as "side" information.

Thereafter, the steps for generating the difference signal at this lower level are the same as those at the top level, that is, the current level prediction image is subtracted from the current level original image and that difference is quantized and transmitted to the receiver. Thereafter the quantized difference is added to the prediction image at that level to form a new reconstruction image. This procedure is repeated through the resolution pyramid until the bottom level is reached. The reconstructed image at the bottom level is the output image at the level, and it is that image that is displayed by the decoder. That image is also used as described above to form a warped image for the next frame. The warped image reconstruction at the transmitter is, as noted above, performed by the reconstruction circuity 48.

If all of the available bits have been used before the bottom level is reached, the predictions at the lower levels are still generated in the same manner; however, no coding, that is, no quantized difference information is sent to the receiver. Instead, the prediction at the lowest levels will be used directly as the output or reconstruction image at that level and as the error reconstruction image over lines 54 from reconstructor circitry 48.

Details of the Hierarchical Vector Quantization Encoding System

Figure 11:
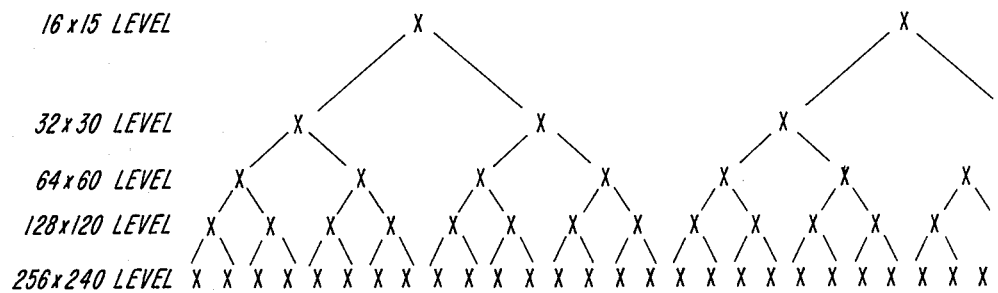
FIG. 11 is a diagrammatic representation of a one dimensional decimation process.

Referring to FIG. 11, the resolution pyramid is formed, as noted above, by decimating four times, in this illustrated embodiment, the highest resolution level of the image. In the one dimensional relationship illustrated in FIG. 11, each pair of pixels at a lower level are averaged to form a single pixel at an upper level. The situation is the same both horizontally and vertically so that each higher level picture element is located at the center of a 2×2 pixel group of the lower level. The coding method also provides for generating, using an interpolation procedure, the pixels at a lower level from a higher level. The interpolation process is applied, for example, to the warped and reconstructed images to obtain images for processing at the next lower level and is effected by a bilinear interpolation. The interpolation factors are 0.75 and 025.

In the illustrated embodiment of the invention, arithmetic coding is employed for both coding of information for transmission from the lossy compressor 28 as well as, and as will be discussed in more detail below, the coding of scalar data from lossy compressor 46. Arithmetic coding is well known to those skilled in the art. In particular, it can be applied advantageously to describing the locations of non-zero transform or other array variables. The symbol probabilities are changed depending upon previously transmitted values and the sequence position of the coefficient. Prestored probabilities are employed since on-line adaptation does not, in the experience of the inventor, provide significant improvement in this application.

Figure 12:
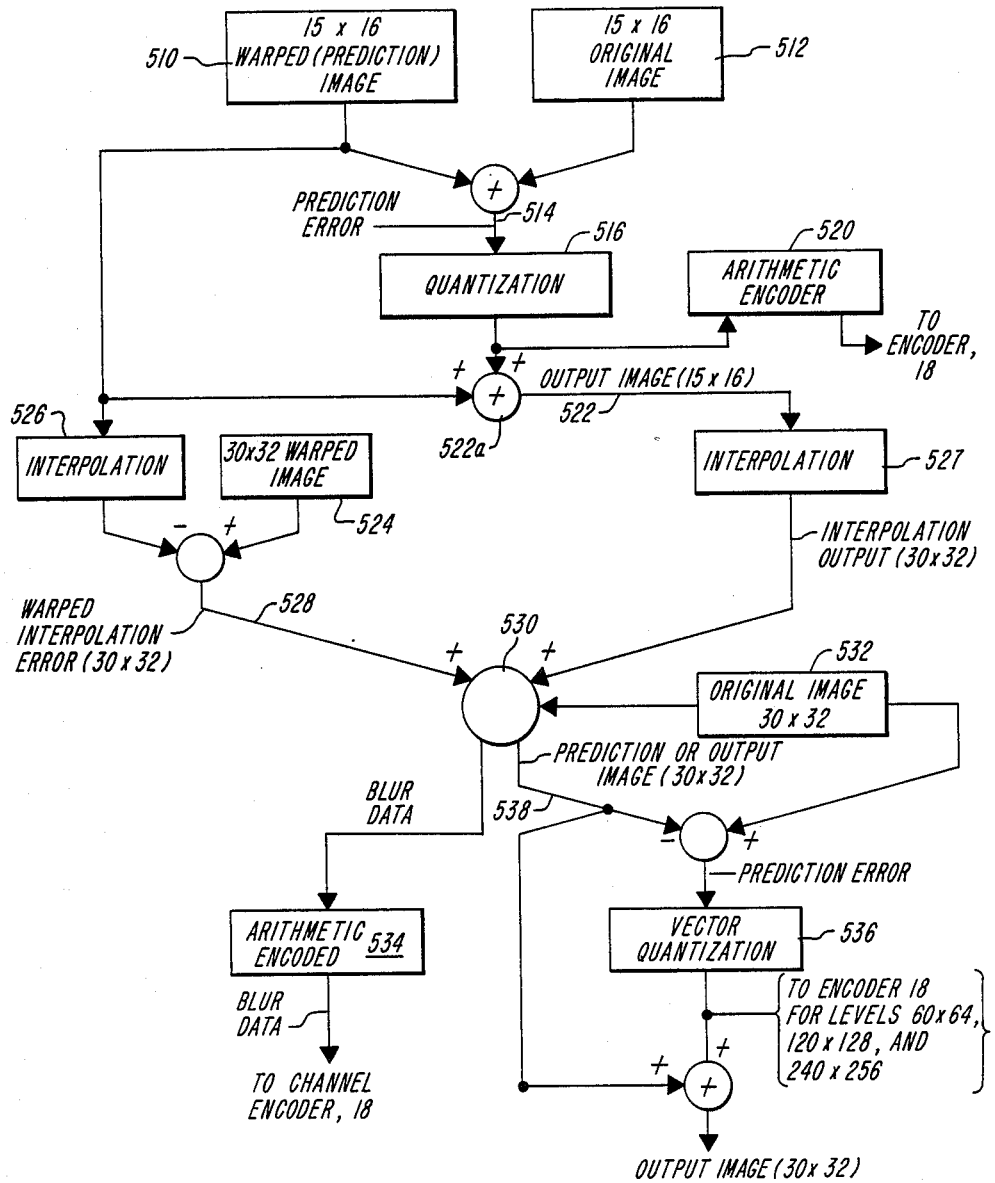
FIG. 12 is a detailed electrical block diagram of lossy compressor 46 according to the invention.

Considering the encoding of the resolution pyramids in more detail, and referring to FIG. 12, the original and warped images have, at the top level, a resolution of 15×16 pixels for the luminance and 8×8 pixels for the chrominance, respectively. FIG. 12 describes the processing of the luminance component; and the processing of the chrominance component (not shown) can be similarly illustrated. The prediction image consists of the top level warped image that was obtained originally by four decimations of the warped luminance and chrominance images, respectively. The prediction error is generated by subtracting the prediction image 510 from the original, uncoded, top level decimated image 512. The image differences over line 514 are quantized by a scalar quantizer 516 having a fixed step size. The quantized information over line 518 is encoded separately for each component, the Y, the I, and the Q components, using the same arithmetic encoder 520 which is also employed for the motion vector transform coefficients. Encoder 520 uses a Markov Model for encoding the non-zero data locations. The encoder has sixteen states depending upon whether the already encoded four nearest neighbors corresponding to the four nearest neighbors illustrated in FIG. 8 are zero or non-zero. The non-zero values are encoded by a memory-less coder that encodes the eight bit quantization indices into the bit stream. The quantized difference image is added to the prediction as noted above, and the result is the output or reconstruction image (over lines 522) at the top level.

The scalar quantizer 516 used in connection with the top level prediction error is a uniform quantizer having a dead-zone around zero. The thresholds (T(i)) are located at:

$$T(i) = i*T$$

$$i = 1,2, \ldots, N \qquad \text{(Equation 1)}$$

The reconstruction levels (R(i)) are defined by:

$$R(0) = 0$$

$$R(i) = (i + \text{Delta}*R) \: i = 1,2, \ldots, N \qquad \text{(Equation 2)}$$

Therefore, a value of X, where X is greater than T(k) but less than T(k+1) is assigned a quantizer index value of k and is reconstructed at the receiver as having a value R(k). The quantizer is also symmetric around zero and sets all values with a magnitude less than T(1) equal to zero.

In accordance with the preferred embodiment of the invention, after quantization in accordance with the equation above has taken place, the quantizer 516 eliminates small non-zero values which are surrounded by all zero values. The criterion for setting a value to zero is that it has been quantized to the smallest non-zero amplitude (that is, a quantizer index of plus or minus one) and that its eight connected neighbors are quantized to a value of zero. This procedure increases the addressing efficiency of the arithmetic coder and diminishes the impression of randomly appearing or "popping" blocks in an image.

For the lower levels of the resolution pyramid, the prediction image is generated by combining the output image from the next higher level with the warped image of the same level. Then, the prediction error is formed by taking the difference of the original image at the current level. The difference image is coded using a gain/shape vector quantizer and the quantized difference is added to the prediction to obtain a new output image at the current level. The Y, I, and Q components are treated as three separate images.

Considering the lower levels in more detail, the prediction image is generated by combining the warped image at the current level with the output and warped images from the next higher level. Specifically, the interpolation error of the warped image is generated using the warped image 524 at the current level and an interpolated version of the warped image from the next higher level (interpolated by circuitry 526). That interpolation error is thus the difference between the current level warped image and the same image that has been decimated and interpolated. As noted above, it contains the details of the warped image that were lost in the decimation to form the next higher level image. The output image from the next higher level is then interpolated at interpolation circuitry 527 to obtain an image at the current level. Thereafter, the warped interpolation error over line 528 is conditionally added by adder 530 to the interpolated output image to form the prediction. That is, for each block of 8×8 pixels, the squared error is determined between the original image stored at 532 and two possible predictions, that is, between the interpolated output image from the next higher level with and without the inclusion of the warped interpolation error.

The elimination of the warped interpolation error is equivalent to low pass filtering the warped image for the prediction. This effective filtering process is performed in all blocks where it provides a significant decrease in the prediction error, that is, in those blocks wherein motion compensation was not successful. The result of the filtering process, termed "blurring," is effected if the "blurred error," multiplied by a weighting factor, such as 1.5 in the illustrated embodiment, is less than the error using the warped interpolation error. Further, if an 8×8 block is blurred at one level, the blurring will be applied at all lower levels corresponding to that part of the image. That is, at the next lower level the blurring will effect an area of 16×16 pixels and at a yet lower level it will effect an area of 32×32 pixels.

The blur information generates a one-bit word for each 8×8 block. For example, a one indicates blurring and a zero indicates no blurring. The information is encoded using an arithmetic coder 534 such as that noted earlier, and since each word contains only one bit, there is no need to encode the non-zero values once the "blur location map" has been encoded.

The particular arithmetic encoder 534 for the blur information uses five binary variables to select one of thirty-two states with corresponding probabilities. The binary variables are the four previously encoded blur words for neighboring blocks at the same level and the blur word for the higher level neighbor, that is, the block at the next higher level that corresponds to the current block. Thus, the encoder does not make explicit use of the fact that blurring at one level propagates to lower levels and instead this relationship is reflected in the probabilities for the various states having a non-zero higher level neighbor.

The prediction errors themselves are coded by a vector quantizer 536. Thus, at each level, the Y, I, and Q components are treated as three separate images. Each different image, generated for each level, is thus divided into blocks of 4×4 pixels. Each block then becomes the "vector" and is coded by the gain/shape vector quantization by first determining the best fitting shape and thereafter applying the appropriate gain. The shape code book contains normalized vectors (selected according to the LBG algorithm as is well known in the art) and the optimum shape vector is that code book vector which has the highest correlation with the data vector to be quantized. That is, the inner product of the data vector has a maximum for the optimum shape vector. The data vector is reconstructed at the receiver as the selected shape vector multiplied by a gain factor. The gain which gives the smallest squared error for the selected "shape" vector is quantized by selecting a reconstruction value from the gain code book. This is the scalar quantization noted above.

For computational reasons, an exhaustive search of the shape code book, which typically has $L=2^{}D$ shape vectors (when D equals 12 or 13), is not practical in real time. Instead, a binary tree search, which requires $D+1$ inner products to be generated (as compared to $2^{}D$ inner products for an exhaustive search) is employed. At each level of the tree search, the inner product is generated between the data vector and a prestored difference between two shape vectors. The decision depends on whether the inner product is positive or negative; and when all D levels of the binary tree search have been traversed, the shape vector has been determined. Thereafter, the inner product between the selected shape vector and the data vector is generated to obtain the gain factor. This search procedure is well known in the art.

In the illustrated embodiment, the binary code book of size $2^{}D$ actually consists of a collection of code books of different sizes for each level; and at level M there exists a code book of size $2^{}M$, $M=1,2,D$. In the vector quantizer 536, this structure is used to vary the shape code book size depending upon the gain factor. Thus, a smaller code book of size $2^{**}D1$, where D1 is less than D, is used for blocks where the gain was quantized to the smallest non-zero value, R(1). In blocks where the gain is larger, however, a full sized code book is used.

As noted above, the gain factors are quantized by a uniform quantization to provide an index having a maximum value of $2^{**}B$. Isolated ones, as noted above, are eliminated, and encoding is performed using an arithmetic coder. The non-zero locations are encoded using five binary variables (thirty-two states) which include the four previously encoded neighbors at the same level and the higher level neighbor that is also available to the receiver as well as to the transmitter. The non-zero B-bit values are encoded by a memory-less encoder.

The shape vectors are encoded using fixed length codes. For each non-zero gain value therefore, the shape vector needs to be transmitted. For gain values greater than one, D bits describe the shape vector, while for gains with a quantizer index equal to one, the smaller code book requiring D1 bits is used.

When shape/gain vector quantizer encoding is applied repeatedly to the same image to build up the image to its full resolution, the coding becomes less and less efficient. This occurs not only because the coding error itself becomes more noise-like, but also because the code book becomes exhausted of "good vectors." Thus, the coding error rapidly becomes "orthogonal" to the code book. This effect is, in accordance with the claimed invention, significantly reduced by changing the image block boundary locations from frame to frame. Therefore, at the bottom levels, the blocks are shifted from frame to frame a few pixels, preferably along both the horizontal and vertical axes. This process substantially increases efficient coding in the system.

The remaining levels can be encoded using the procedures applied at the (30×32) level, and using equivalents of elements 524, 526, 527, an adder 538, and elements 530, 534, and 536, but with the exception that the image data will be encoded, in the preferred embodiment, as described below.

In accordance with the preferred embodiment of the invention, at the top level, the system does not provide any adaptive blurring and pure scalar quantization is employed. At the next level, the 32×30 level for the Y component and the 15×16 level for the chrominance components, the warped interpolation error is selectively added to the interpolated output images from the top level and therefore, at this level, blur information is transmitted. However, in the preferred embodiment of the invention, no encoding of the image information, that is, of the output image error, is performed in the illustrated embodiment. The prediction images themselves are the outputs from this level. In the three bottom levels, all of which are treated identically, adaptive blurring is used when generating the prediction images, and the prediction error is encoded using gain/shape vector quantization. This is indicated diagrammatically in FIG. 12.

The primary strategy for the encoding process is to use a fixed number of bits to encode each frame. The encoding starts at the top level and works through the pyramid level structure to the bottom level; and at all levels except the bottom level fixed quantizers are employed. For each level, the quantizer characteristics are selected based upon subjective image quality criteria. At the bottom level, however, the quantizer is chosen so that the number of generated bits is approximately equal to the number of bits still available for the frame.

However, during heavy motion, all of the available bits may be used before the bottom level is reached. In that instance the quantizer for, for example, the next to lowest level can be selectively adjusted to provide the desired number of output bits for the frame. Thus at the bottom level, while the prediction is still generated in the usual way and the blur information is encoded and transmitted, no vector quantization is performed and instead the prediction image itself is the output image.

In the illustrated embodiment, there can occur some circumstances, for example a scene change, when it may not be possible to encode even the next to lowest level. In that instance, the coding will stop at the next level up (60×64 for luminance and 30×32 for chrominance). If the coding at this level generates more bits than the desired number of bits per frame, the coding is still performed and the frame rate will temporarily slow down due to the large number of bits being generated. For the two bottom levels, the prediction is generated as usual and the blur information is transmitted; however, vector quantization is not performed.

Referring to FIG. 3, at the receiver, the transmitted and coded data is decoded and the new frame generated. In particular, the data representing the resolution pyramids is decoded by reconstruction circuitry 76 level by level from the top of the pyramid down to the bottom. At the top level, the quantized difference image is decoded and added to the warped image at that level (in selective adder 100 which includes decimation circuitry). Thereby, the output image at the top level is reconstructed. The lower levels are then reconstructed (by adder 100) by first forming the prediction using the transmitted blur information available over lines 84 from reconstruction circuitry 76 and then decoding the difference image and selectively adding it to the prediction image to form a new reconstructed image for that level. The process continues until the bottom level is reached and the bottom level image is transferred to the display frame buffer 98.

The arithmetic decoder which is used in a number of processes, that is, decoding the motion transform coefficients, the blur information, and the image information from lossy compressor 46, operates as is well known in the art. Since the non-zero locatioss were encoded using different probabilities depending upon which state the coder was in, the arithmetic decoder regenerates the state for each position in the location map as the decoding proceeds. The state, in combination with the encoded data, then determines whether or not a zero is used for each map location. Once the map indicating the location of non-zero values has been decoded, the B-bit values are decoded and incremented by one and placed in the appropriate positions in the map.

Looking in more detail at the generation of the resolution pyramids and decoding thereof, the process follows the inverse of the method used in lossy compressor 46. Thus, since the receiver decoding process follows the encoding process of the transmitter, the prediction at the top level is generated from the warped top level image. The quantizer indices are decoded using the arithmetic decoder and the quantized difference image is reconstructed from the quantizer indices and is then added to the prediction image to give the top level output image (corresponding to adder 522a and the output over lines 522 of the transmitter). At the lower levels, the prediction is formed by selectively adding the warped interpolation error to the interpolated output image from the next higher level (corresponding to adder 530 in the transmitter). That output image, and the warped image at the next output level, are interpolated to give images at the current level. The blur information is decoded using the arithmetic decoder and then, in each 8×8 block of the interpolated higher level output for which the blur code is zero, the difference between the current level warped image and the interpolated higher level warped image is added (corresponding to adder 538 of the transmitter).

All the lower levels, according to the preferred embodiment of the invention, the vector quantized information is decoded first by decoding the gain values using the arithmetic decoder, and then, for the non-zero values, decoding the shape indices. For every block with a gain quantizer index of one, a D1-bit word is extracted from the bit stream to indicate the shape vector, whileffor blocks with an index greater than one, a D length bit word is extracted from the bit stream. The difference image is reconstructed by taking the shape vector from the appropriate code book and scaling it by the gain value. This is done for each non-zero 4×4 pixel block. The output image is thereafter formed by adding this reconstructed difference to the prediction. (This corresponds to the operation of the adder 540 of the transmitter.) The output image from the bottom level in the final reconstructed image is then transferred to the display frame buffer as the final output image.

The illustrated lossy compressor 46 can be implemented in hardware, in software, or in a combination thereof. In one particular embodiment, attached hereto as Appendix A, a software implementation of compressor 46 and the corresponding receiver operation is provided.

The Motion Estimator

Referring now to FIG. 6, in accordance with the illustrated embodiment, the motion estimation circuitry 26 employs an iterative spatial domain approach which quickly converges through an error minimization process for determining the displacement vectors of an input signal. In the preferred embodiment, an adaptive, steepest descent approach method is employed. The method has good convergence behavior.

In Hinman, B., "Theory and Application of Image Motion Estimation," Master's Thesis, M.I.T. (1984), equation 3.12 describes the iterations for determining a displacement vector v for a pixel having a location in an image f. The new image is represented by g. That equation is reproduced herein as Equation 3 where the "i" represents an earlier value of the displacement vector and "i +1" represents a next value of the displacement vector.

$$V^{i+1} = V^i - 2e \sum_p [g(p) - f(p - v^i)] \nabla (\cdot) f(p - v^i) \quad \text{(Equation 3)}$$

Equation 3 can be implemented in accordance with FIG. 9 where the input g and f frames are stored in buffes 200 and 202 respectively. The gradient value of the frame is determined by a gradient computer 204 and spatial interpolators 206, 208 provide the values of $\bar{f}$ required by the summation in Equation 3. A summing element 210 and a multiplication element 212 yield the error gradient value which is accumulated in an accumulator 214. The output of the accumulator 214 is multiplied by a step size adaptor 215 at a multiplier 216; and the result is used to update the vector displacement value in an accumulator 218. The accumulator receives the initial vector prediction value from a prediction hardware 220.

The updated vectors are employed by interpolators 206 and 208 in determining the values of "f" and the vector output field is stored in a buffer 222. The entire apparatus operates under the control of a system controller 224 which monitors the value of the error gradient accumulator output and in response thereto adaptively changes the step size.

Referring now to FIG. 7, an improved method for implementing the adaptive steepest descent error minimization iterative spatial-domain motion estimator 26, defined by Equation 3, provides for use of a single interpolator 240 operating upon the f frame and a gradient computation circuitry then operating upon the interpolated value output of interpolator 240. There results from this circuitry the elimination of one of the FIG. 6 interpolators thus providing a savings of hardware and/or software.

In employing this method, the three important parameters are the initial step size, e, the stopping or cutoff threshold, T, and the predictor set, $a_k$. The initial step size plays an important role in determining the rate at which the method converges upon the motion vector displacement. When e is chosen to have a very small value, the method requires an excessive number of iterations before reaching a sufficiently small neighborhood of the minimum. As the value of e increases, the rate of convergence also increases but there comes a value when e is so large that the search procedure will oscillate about the minimum without converging. The value of e must be determined by empirical tests. For a block size of 4×4, a value of $3 \times 10^5$ has been found to provide the best convergence behavior.

The cut-off threshold is compared to the magnitude of the error gradient times the initial step size, e, for each iteration. This threshold must be chosen with two constraints in mind. First, it should be sufficiently small so that a displacement close to the actual displacement is reached. The second and opposing constraint is that as the threshold decreases, the number of required iterations increases dramatically. Thus, as with the step size, the appropriate cut-off threshold must be found empirically. (When the step size varies, as described below, the threshold, T, as defined above continues to be compared against the multiplicative product of the initial step size, e, and the error gradient.)

In determining the cutoff threshold empirically, two indicators are of interest. They are the average number of iterations per block and the motion compensated frame difference energy. In order to find the best value of T, the estimation and compensation process is run several times. Starting with a small cut-off threshold, a minimal value of the motion compensated frame difference energy is determined. As the threshold is increased, the average number of iterations steadily drops while the motion compensated frame difference energy remains essentially constant. Eventually, however, a value of the threshold is reached at which the estimated displacements become inaccurate and the motion compensated frame difference energy begins to rise. In seeking the point of inflection in the motion compensated frame difference energy as a function of T, a value of $7 \times 10^{-3}$ was found to be most appropriate. This threshold corresponds to a minimum vector update of $7 \times 10^{-3}$ pixels.

The selection of the predictor coefficients affects both the average number of iterations and the motion compensation frame difference energy.

The selection of the initial value of the displacement vector for each block is, in the illustrated embodiment, chosen as a linear combination of displacement vectors adjacent thereto. Thus, referring to FIG. 8, the steepest descent method provides access to the displacement vectors above and to the left of a present displacement vector $V_o$. Thus, in accordance with the illustrated embodiment, the present displacement vector is defined by Equation 4 as:

$$V_0 = \sum_{j=1}^{4} a_j V_j \qquad \text{(Equation 4)}$$

The $a_j$ are the predictor coefficients while the $V_j$ are the previously determined displacement vectors.

The preferred vector predictors, $a_j$, are $a_1=0.3$, $a_2=0$; $a_3=0.4$ and $a_4=0.3$. For these values of the vector predictors, in combination with the step value and threshold values noted above, for one set of data, the average number of iterations was 6.71, and the motion compensation frame difference energy was 14.1 dB's lower than the non-motion compensated frame difference energy.

In accordance with a preferred embodiment of the invention, the selected value of e, the initial step size can be adapted to change as a function of the error gradient. Thus, according to this illustrated embodiment of the invention, and under the control of the system controller 224, the step size value is adapted to change, depending upon the present gradient error value, or the present and one or more previous error gradient values, so that the step size for the vector displacement does not become unreasonably small. A description of two methods for selecting step size is provided in the Hinman thesis beginning at page 33.

According to the preferred embodiment of the invention, the second method, defined by Equations 3.18, 3.19, and 3.20 of the Hinman thesis is modified to reduce the processing load of the system. In this embodiment, the equations 3.18, 3.19, and 3.20 are modified so that:

$$\text{(new step size)} = \text{(old step size)} \cdot \alpha \qquad \text{(Equation 5)}$$

where $$\alpha = \begin{cases} 1.4 \text{ if } R > 0 \\ 0.3 \text{ if } R < 0 \end{cases} \qquad \text{(Equation 6)}$$

and $$R = [\text{Gradient } E(V_x^i)] \cdot [\text{Sign } [\text{Gradient } E(V_x^{i-1})]] + [\text{Gradient } E(V_y^i)] \cdot [\text{Sign } [\text{Gradient } E(V_y^{i-1})]]$$

and "Gradient E" represents the gradient of the present x or y error function, and "Sign [·]" equals ±1 depending upon the sign of the argument. Equation 6, thus defined, provides a third method for an adaptive steepest descent approach. As noted above, however, the cutoff threshold value, T, is measured against the initial step size. Thus, the illustrated T can be defined as the product of a constant times the error gradient.

Further, in accordance with the preferred embodiment of the invention, the system controller 224 also prevents the displacement increment step size from being greater than a selected threshold, for example, greater than one pixel, and further prevents the maximum value of the displacement vector from being greater than a second selected threshold, for example greater than $7\frac{1}{2}$ pixels. In this manner, more control of the steepest descent process is available and singularities which prevent convergence can be avoided.

The illustrated motion estimator can be implemented in hardware, in software, or in a combination thereof. In one particular embodiment, attached hereto as Appendix C, a software implementation of an adaptive steepest descent method and apparatus is provided.

Adaptive Filter Embodiment

Figure 13:
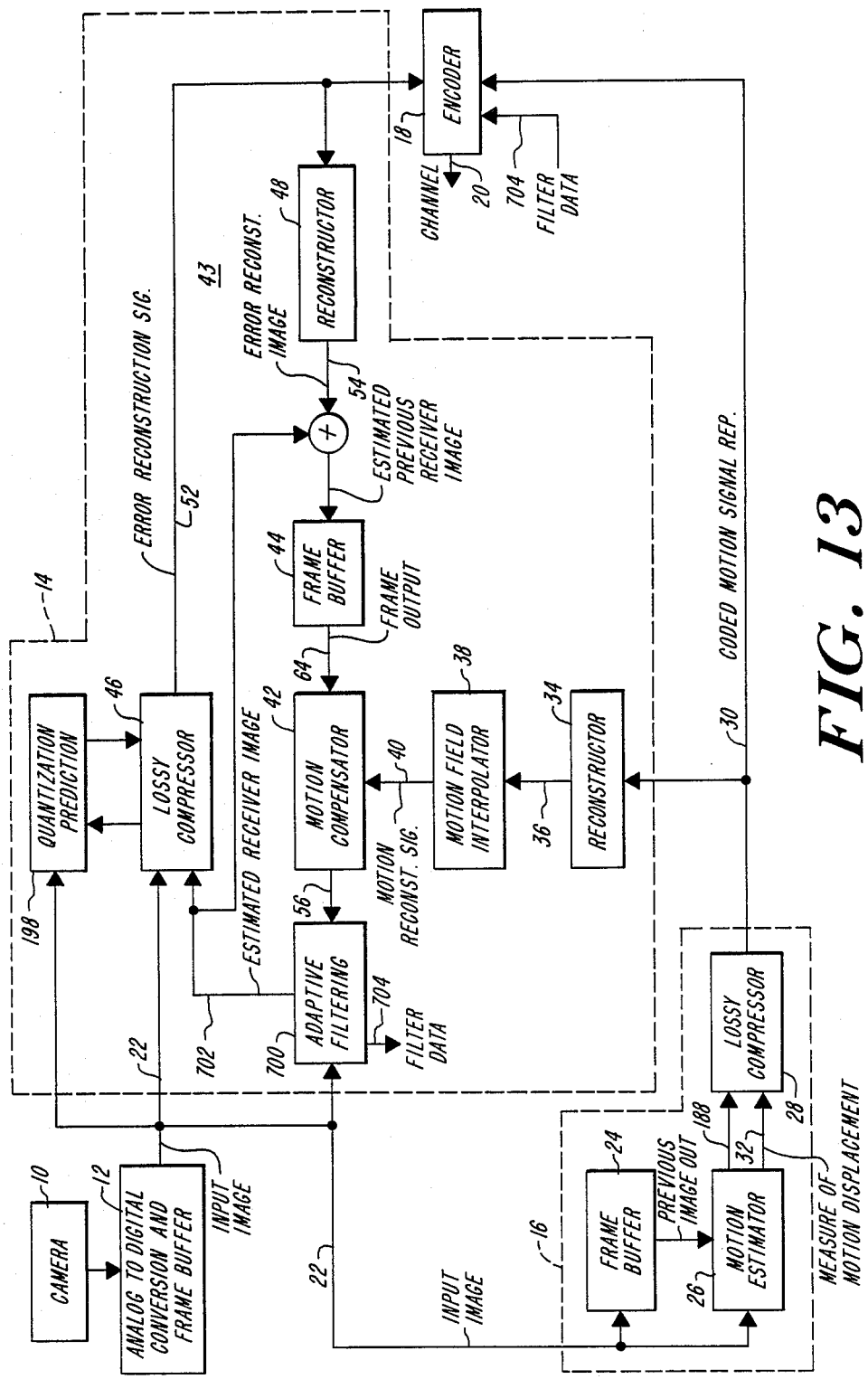
FIG. 13 is an electrical block diagram of the transmitter of a motion-compensated image coding apparatus having adaptive filtering and employing the invention.

Referring to FIG. 13, in another illustrated embodiment of the invention, the blur information provided by the lossy compressor 46 is eliminated and in its place is provided a selectively operable adaptive filter 700. In the operation of this embodiment of the invention, for those blocks wherein the motion compensation data is accurate, the signal over lines 56 is applied directly, by the adaptive filter 700, to its output over lines 702. For those blocks for which motion compensation is not adequate, as described in more detail below, the adaptive filter can, in effect, low-pass filter the output data over lines 56 for the block and provides over lines 702, for those regions wherein filtering is advantageous, a low-pass version of the motion compensation reconstructed receiver image for the block. In addition, the adaptive filter provides filter data, over lines 704, to the channel encoder for transmission to the receiver as side information.

Figure 14:
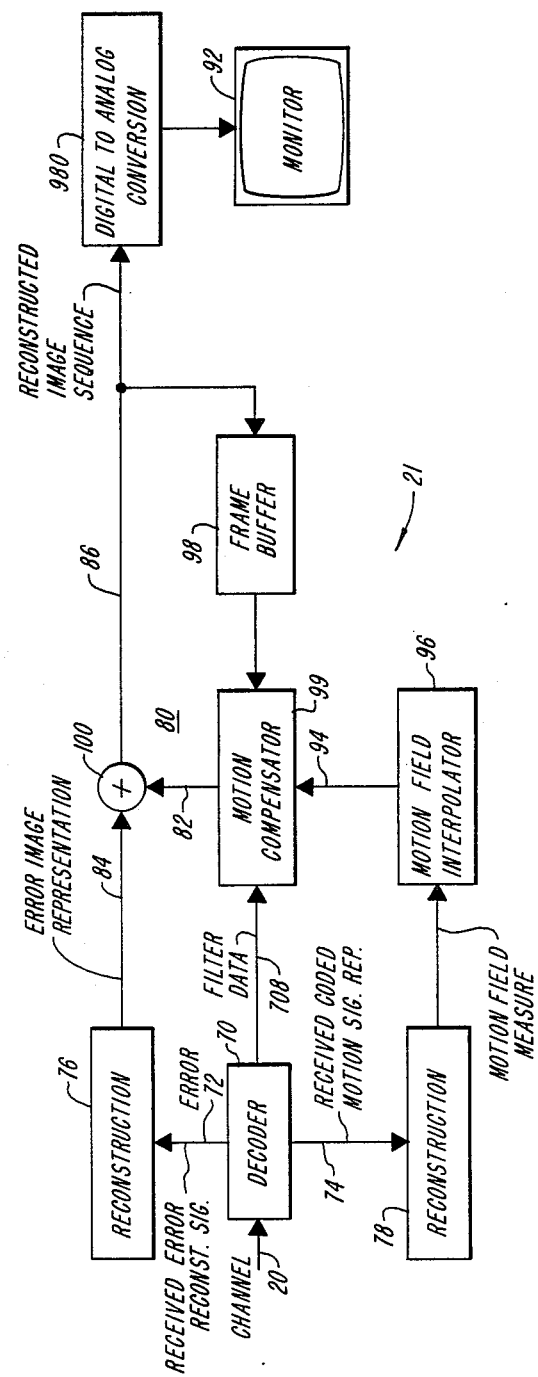
FIG. 14 is an electrical block diagram of the receiver of a motion-compensated encoding system for receiving the channel signals from the transmitter of FIG. 13.

Referring to FIG. 14, the receiver decodes the filtering information and provides a filter data signal over line 708. The remaining circuitry of the receiver in FIG. 14 operates in a manner corresponding to that illustrated in FIG. 3 except that the filter data signal determines whether the motion compensation data for a block will be low pass filtered prior to use.

In accordance with this embodiment of the invention, therefore, the hierarchical encoding method receives data which is filtered prior to receipt. Accordingly, the encoding method does not, in this illustrated embodiment, provide further blur information which would in large part be redundant to the adaptive filtering data being already transmitted to the receiver. Considering the adaptive filter in more detail, as noted above, the output of the motion compensator 42 represents the receiver motion compensated image as a result of applying the coded motion signal representation from the lossy compressor 28 to the previous frame which is stored in frame buffer 44. The receiver motion compensated image, under certain circumstances, can be improved in various spatial regions (blocks) by selectively applying a spatial low-pass filter. To decide whether the filtering process should be performed on a block of the receiver motion compensated image, a comparison of the squared prediction error between the original image and the unfiltered and filtered prediction is performed on a block-by-block basis.

A block, in this illustrated embodiment, is designated as an 8×8 grouping of picture elements. For each block, the prediction having the least error energy (weighted, for example, by a constant to provide a bias in favor of unfiltered prediction) is selected, and that decision information, the filter data available over line 704, is made available to the encoder 18. The filter data is sent to the receiver to enable it to perform the same operation as the transmitter on each corresponding block during the receiver image reconstruction process. The receiver decodes and provides the filter data to motion compensator 99 over lines 708. After the adaptive low-pass filtering decision has been made for a block, the resulting block image, whether or not filtered, is employed, as noted above, as the estimated receiver image over lines 702.

The adaptive filter has four stages of operation. First, the block is low-pass filtered. Second, an energy measurement is made for both the filtered and unfiltered versions of the block in comparison to the original image. Third, a decision is made to determine if the low-pass filtered block should be inserted in place of the unfiltered receiver motion compensated image. Finally, the information describing the filter usage for each block is encoded (the filter data on lines 704) and sent to the encoder 18. Further details of the adaptive filter operation are described in U.S. application Ser. No. 001,326 referred to hereinabove.

Figure 15:
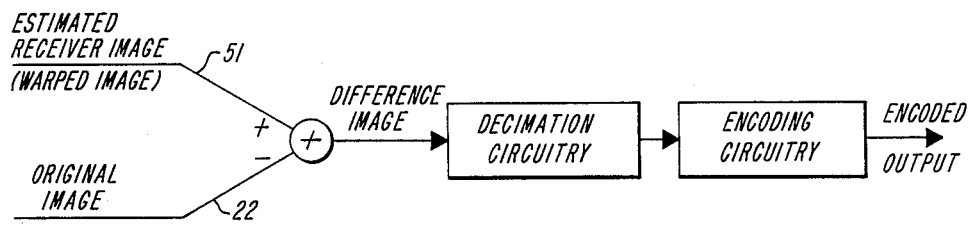
FIG. 15 is a general block diagram of an alternate embodiment of lossy compressor according to one aspect of the invention.

The hierarchical encoding method and apparatus described hereinabove can also be advantageously employed in connection with the transmission of a sequence of images in which motion compensation is not provided. In this instance, the estimated receiver image over, for example, lines 51 in FIG. 2 will be the reconstructed receiver image designated as the frame output of the frame buffer 44 over lines 64. Further, the input image over lines 22 and the estimated receiver image over lines 51 need not be individually decimated by lossy compressor 46 but can be, referring to FIG. 15, input to a difference circuitry 720, the output of which, representing the error signal at the receiver, can then be input to a lossy compressor for decimation and hierarchical encoding in accordance with the invention described hereinabove. At the receiver, the motion compensator 99 and its related circuitry would similarly be eliminated if motion compensation were not employed. Similarly, the reconstruction circuitry 76 would be modified in accordance with the transmitter operation to reconstruct the error image representation over lines 84 when the circuitry of FIG. 15 is employed. These changes would be apparent to those practiced in the art.

Additions, subtractions, deletions, and other modifications of the preferred particular embodiments of the invention will be apparent to those skilled in the art and are within the scope of the following claims.

APPENDIX A

*Remarks*

1. The following routines are not included in the listings:
   IGET, RGET: Prompt for parameters
   AD_CODE_BIT: Performs arithmetic coding of a bit.

2. WEIGHT_WARP and FILT_INFO_CODING are available in three identical copies (for luminance (Y) and chrominance (I, Q)). This is not essential; it was only a simple way to keep some internal variables and statistics separate for Y, I, and Q.

3. DIFFCODER is a recursive routine; it calls itself.

The following listings are enclosed:

DIFFCODER.C
ADCODER.FOR
CODELOCS.FOR
DOTHEVQ.FOR
GAINBITS.FOR
GAINQZ.FOR

LINUP.FOR
RFORMVEC.FOR
SCALARCOD.FOR
VQBIN.FOR
UQCODEC.FOR
VSUBS.FOR
WEIGHTWAR.FOR

```
*********************** PictureTel Corporation **************************
*
* MODULE:      DIFFCODER_TREE.TXT
*
* DESCRIPTION: Subroutine tree description for module DIFFCODER.
*
* AUTHOR:      Staffan Ericsson
*
* DATE CREATED: May 25, 1987
*

DIFFCODER                                       File: DIFFCODER.C
    LOWRES_REAL                                 File: LOWUP.FOR
        RGET                                    Library: STRLIB UPRES_REAL                                  File: LOWUP.FOR
        VCOPY                                   File: VSUBS.FOR VACC                                        File: VSUBS.FOR
    VCOPY                                       File: VSUBS.FOR
    VSUB                                        File: VSUBS.FOR VQ_CODEC                                    File: VQCODEC.FOR
        DO_THE_VQ                               File: DOTHEVQ.FOR
            GAIN_BITS                           File: GAINBITS.FOR
                AD_CODER                        File: ADCODER.FOR
                    AD_CODE_BIT                 File: ADCODEBIT.FOR
                CODE_LOCS                       File: CODELOCS.FOR
                    AD_CODE_BIT                 File: ADCODEBIT.FOR
                GAIN_QZ                         File: GAINQZ.FOR
                    REJECT_SINGLE               File: GAINQZ.FOR
                IGET                            Library: STRLIB
                RGET                            Library: STRLIB
            IGET                                Library: STRLIB
            RGET                                Library: STRLIB
            VACC                                File: VSUBS.FOR
            VDOT                                File: VSUBS.FOR
            VQ_BIN                              File: VQBIN.FOR
                VDOT                            File: VSUBS.FOR
            VQ_BIN_2                            File: VQBIN.FOR
                VQ_BIN                          File: VQBIN.FOR
                VDOT                            File: VSUBS.FOR
        IGET                                    Library: STRLIB
        RFORM_IMAGE                             File: RFORMVEC.FOR
        RFORM_VECTORS                           File: RFORMVEC.FOR
        ZER                                     File: VSUBS.FOR SCALAR_CODEC                                File: SCALARCOD.FOR
        DO_THE_VQ                               File: DOTHEVQ.FOR
            ... (See above)

WEIGHT_WARP                                 File: WEIGHTWAR.FOR
        FILT_INFO_CODING                        File: WEIGHTWAR.FOR
            CODE_LOCS                           File: CODELOCS.FOR
                AD_CODE_BIT                     File: ADCODEBIT.FOR /* Perform hierarchical coding of image */
/* July 16, 1986:  Reserve bits for filter info at lower levels */
/* July 17, 1986:  Hierarchical coding of chroma, too */ define SAVE_BITS_FOR_FILTER 400 diffcoder (Yorig, Ywarp, Iorig, Iwarp, Qorig, Qwarp, hsize,vsize,
           maxbits, usedbits, stepmin, stepmax)
/* Reconstructed image returned in Ywarp */
float Yorig[], Ywarp[], Iorig[], Iwarp[], Qorig[], Qwarp[],
           stepmin[], stepmax[];
long *hsize, *vsize, *maxbits, usedbits[];
{
    float YLorig[120][128], YLwarp[120][128], YLwarp_up[240][256],
        YLout_up[240][256], Ydiff[240][256];
    float ILorig[60][64], ILwarp[60][64], ILwarp_up[120][128],
        ILout_up[120][128], Idiff[120][128];
    float QLorig[60][64], QLwarp[60][64], QLwarp_up[120][128],
        QLout_up[120][128], Qdiff[120][128];
```

```
   long hsize2, vsize2, vsize2_even, vsize_tot, maxvqbits, n, n_iq, i,
        fe_bits, fe_bits_y, fe_bits_i, fe_bits_q;

/* printf ("\n Entering diffcoder: %d x %d \n", *hsize, *vsize);*/ n = *hsize * *vsize;
   hsize2 = *hsize / 2;
   vsize2 = (*vsize + 1) / 2;
   n_iq = hsize2 * vsize2;
   vsize2_even = vsize2 + (vsize2 % 2);

if (*hsize > 16)
   {
      /* Down-convert luma *****************************************/
      lowres_real (Yorig, hsize, vsize, YLorig);
      lowres_real (Ywarp, hsize, vsize, YLwarp);
      /* Down-convert chroma ***************************************/
      if (vsize2 != vsize2_even)
      {
         vcopy (&Iorig [hsize2 * (vsize2-1)], &Iorig [hsize2*vsize2], &hsize2);
         vcopy (&Iwarp [hsize2 * (vsize2-1)], &Iwarp [hsize2*vsize2], &hsize2);
         vcopy (&Qorig [hsize2 * (vsize2-1)], &Qorig [hsize2*vsize2], &hsize2);
         vcopy (&Qwarp [hsize2 * (vsize2-1)], &Qwarp [hsize2*vsize2], &hsize2);
      }
      lowres_real (Iorig, &hsize2, &vsize2_even, ILorig);
      lowres_real (Iwarp, &hsize2, &vsize2_even, ILwarp);
      lowres_real (Qorig, &hsize2, &vsize2_even, QLorig);
      lowres_real (Qwarp, &hsize2, &vsize2_even, QLwarp);
      /* Up-convert warped image and save it ***********************/
      upres_real (YLwarp, hsize, vsize, YLwarp_up);
      upres_real (ILwarp, &hsize2, &vsize2_even, ILwarp_up);
      upres_real (QLwarp, &hsize2, &vsize2_even, QLwarp_up);
      /* Code lowres image *****************************************/
      diffcoder (YLorig, YLwarp, ILorig, ILwarp, QLorig, QLwarp,
                       &hsize2, &vsize2, maxbits, &usedbits[1],
                       &stepmin[1], &stepmax[1]);
      maxvqbits = *maxbits - usedbits[1];
      /* Up-convert output *****************************************/
      upres_real (YLwarp, hsize, vsize, YLout_up);
      upres_real (ILwarp, &hsize2, &vsize2_even, ILout_up);
      upres_real (QLwarp, &hsize2, &vsize2_even, QLout_up);
      /* Add warped HF selectively *********************************/
      weight_warp_y (YLout_up, YLwarp_up, Ywarp, hsize, vsize,
                       &maxvqbits, Yorig, &fe_bits_y);
      maxvqbits -= fe_bits_y;
      weight_warp_i (ILout_up, ILwarp_up, Iwarp, &hsize2, &vsize2,
                       &maxvqbits, Iorig, &fe_bits_i);
      maxvqbits -= fe_bits_i;
      weight_warp_q (QLout_up, QLwarp_up, Qwarp, &hsize2, &vsize2,
                       &maxvqbits, Qorig, &fe_bits_q);
      maxvqbits -= fe_bits_q;
      fe_bits = fe_bits_y + fe_bits_i + fe_bits_q;
   }
   else
   {
      usedbits[1] = 0;
      fe_bits = 0;
      maxvqbits = *maxbits;
   }

/* Now, we have the prediction in Ywarp/Iwarp/Qwarp *************/
   /* Form prediction error ****************************************/
   vsub (Yorig, Ywarp, Ydiff, &n);
   vsub (Iorig, Iwarp, Idiff, &n_iq);
   vsub (Qorig, Qwarp, Qdiff, &n_iq);
   /* Code prediction error ****************************************/
   if (*hsize < 256)
      maxvqbits -= SAVE_BITS_FOR_FILTER;
   if (*hsize > 32)
   {
      printf ("\n VQ of %d x %d luma, %d x %d chroma\n",
                       *hsize, *vsize, hsize2, vsize2);
      vq_codec (Ydiff, hsize, vsize, Idiff, Qdiff, &hsize2, &vsize2,
                &maxvqbits, &usedbits[0], &stepmin[0], &stepmax[0]);
```

```
    }
    else
    {
        printf ("\n Scalar qz of %d x %d luma,  %d x %d chroma\n",
                     *hsize, *vsize, hsize2, vsize2);
        for (i=0; i < vsize2; i++)
        {
           vcopy (&Idiff[i*hsize2], &Ydiff[n + i * *hsize], &hsize2);
           vcopy (&Qdiff[i*hsize2], &Ydiff[n + i * *hsize + hsize2], &hsize2);
        }
        vsize_tot = *vsize + vsize2;
        scalar_codec (Ydiff, hsize, &vsize_tot, &maxvqbits, &usedbits[0],
                              &stepmin[0], &stepmax[0]);
        for (i=0; i < vsize2; i++)
        {
           vcopy (&Ydiff[n + i * *hsize], &Idiff[i*hsize2], &hsize2);
           vcopy (&Ydiff[n + i * *hsize + hsize2], &Qdiff[i*hsize2], &hsize2);
        }
    }
    usedbits[0] = usedbits[0] + fe_bits + usedbits[1];   /* Accumulate bits */

/* Add quantized residual to warped frame ************************/
    vacc (Ywarp, Ydiff, &n);
    vacc (Iwarp, Idiff, &n_iq);
    vacc (Qwarp, Qdiff, &n_iq);

return(1);
}
```

```
        SUBROUTINE AD_CODER (x, depth, count, codelen)
        IMPLICIT NONE
        INTEGER x, depth, count(0:1,0:2**depth-2)
        REAL codelen
        PARAMETER MAX_DEPTH=10
        INTEGER bit(0:MAX_DEPTH-1), jj, i, pos, start

***     TYPE *,'Entering AD_CODER -- codelen =',codelen,'   x =',x
        IF (depth .GT. MAX_DEPTH)  STOP 'AD_CODER -- Exceeding max depth'
        jj = x
        DO i = 0,depth-1
           bit(i) = MOD(jj,2)
           jj = jj/2
        END DO
        jj = 0
        DO i = 0,depth-1
           pos = depth - 1 - i
           start = 2**i - 1
***        TYPE *,'Pointer =',start+jj
           CALL AD_CODE_BIT (bit(pos), count(0,start+jj), codelen)
           jj = 2 * jj + bit(pos)
        END DO

RETURN
        END

* code_locs- Adaptive coding of non-zero locations
*       qz_index and prev_index are non-negative
        SUBROUTINE CODE_LOCS (qz_index, qzdim, mhor, mvert,
                      prev_index, prevdim, count, usedbits)
        IMPLICIT NONE
        PARAMETER MAXHOR=256/4, MAXVERT=240/4, NCOND=32
        INTEGER mhor, mvert, qzdim, prevdim, qz_index(0:qzdim-1,0:mvert-1),
     .          prev_index(0:prevdim-1,0:(mvert-1)/2),
     .          count(0:1,0:NCOND-1), usedbits
        REAL codelen
        INTEGER cond, i,j, ivec codelen = 0.
        DO j = 0,mvert-1
        DO i = 0,mhor-1
```

```
* Form condition index
        cond = MIN (prev_index(i/2,j/2), 1)
        cond = 2 * cond
        IF (i .GT. 0)  cond = cond + MIN (qz_index(i-1,j), 1)
        cond = 2 * cond
        IF (j .GT. 0)  cond = cond + MIN (qz_index(i,j-1), 1)
        cond = 2 * cond
        IF (j .GT. 0 .AND. i .GT. 0)
                   cond = cond + MIN (qz_index(i-1,j-1), 1)
        cond = 2 * cond
        IF (j .GT. 0 .AND. i .LT. mhor-1)
                   cond = cond + MIN (qz_index(i+1,j-1), 1)
* Code zero/non-zero location
        ivec = MIN (qz_index(i,j), 1)
        CALL AD_CODE_BIT (ivec, count(0,cond), codelen)
     END DO
     END DO
     usedbits = NINT(codelen)

RETURN
     END

* do_the_vq
*       May 12, 1986:   Limit stepsize during reconstruction
*       May 19, 1986:   Two depths
*       May 20, 1986:   Introduced "gainmin"
*       May 22, 1986:   Introduced "max_step" in parameter list
*       May 26, 1986:   Commented out two depths
*       May 27, 1986:   Return "change" containing gain at each pel
*       June 27, 1986:  Write vector and qz indices.
*       July 15, 1986:  Use adaptive arithmetic coding for gains
*       July 16, 1986:  Removed "change" from parameter list
*       July 18, 1986:  Special routine to handle two depths: "vq_bin_2"
*       July 20, 1986:  Removed writing of indices
        SUBROUTINE do_the_vq (x, n, mhor,mvert, code, depth,
                cum, count, maxbits, usedbits, gainmin, max_step)
        IMPLICIT NONE
        INTEGER n,mhor,mvert,depth, maxbits, usedbits, count(0:2**depth-1)
        REAL x(0:n-1,0:mhor*mvert-1), code(0:n-1,0:2,0:2**depth-2),
                cum(0:n-1,0:2**depth-1), gainmin
        PARAMETER M_MAX=256*240/4
        REAL gain(0:M_MAX-1), gain1(0:M_MAX-1), mse, dist
        REAL step, lo_step, hi_step, max_step
        LOGICAL first_pass /.TRUE./
        INTEGER lo_rate, hi_rate, depth1, m, depth1_save
        INTEGER index(0:M_MAX-1), index1(0:M_MAX-1), start, start1, i, icomp,
                ptr, bit0, iter, qz_index(0:M_MAX-1)
        INTEGER vq_bin, vq_bin_2
        REAL vdot
        SAVE depth1_save
        COMMON /KLUDGE/ step
        PARAMETER MAX_ITER=100, COARSE_RATIO=1.25, MARGIN=100, MIN_STEP=1.E-10
        PARAMETER TOO_FEW_BITS=1000 m = mhor * mvert
        IF (m .GT. M_MAX) STOP 'DO_THE_VQ -- Too many vectors'
        IF (first_pass) THEN
           CALL rget ('Initial gain step (no qz.):', step)
           CALL iget ('Depth for gain=1:', depth1_save)
           first_pass = .FALSE.
        END IF
        depth1 = MIN (depth1_save, depth)
* Don't quantize if too few bits available
        IF (maxbits .LE. TOO_FEW_BITS) THEN
           CALL zer (x, n*m)
           usedbits = 0
***        CALL write_codes (m, 0,0, qz_index, index)
           RETURN
        END IF
* Find shape index and gain
        mse = 0.
        DO i = 0,m-1
           IF (depth1 .EQ. depth) THEN
              index(i) = vq_bin (x(0,i), n, code, depth, dist, gain(i))
```

```
              index1(i) = index(i)
              gain1(i) = gain(i)
          ELSE
              index(i) = vq_bin_2 (x(0,i), n, code, depth, dist, gain(i),
                                   depth1, index1(i), gain1(i))
          END IF
          mse = mse + dist
*         Update applicable accumulator
          count(index(i)) = count(index(i)) + 1
          CALL vacc (cum(0,index(i)), x(0,i), n)
      END DO
      mse = mse / FLOAT(n*m)
      TYPE *,'MSE (No gain qz) =',mse,' =',
             10. * ALOG10 (255.**2 / AMAX1(mse,1.E-10)),' dB'
      TYPE *,'Input power =', vdot(x, x, n*m) / FLOAT(n*m)
      TYPE *,'Output power (No gain qz) =',
             vdot(gain, gain, m) / FLOAT(n*m)

IF (step .GE. MIN_STEP) THEN
* Quantize gain to achieve desired bit rate ********************
          IF (gainmin .GT. 1.E-6) THEN
              step = gainmin
          END IF
          CALL gain_bits (gain, gain1, m, mhor, step, depth,depth1,
                          .FALSE., usedbits, qz_index, m*n)     ! Initial guess
          TYPE *,'Initial guess:  step =', step, '  usedbits =', usedbits
          IF (step .GT. gainmin  .OR. usedbits .GT. maxbits) THEN
* Search for stepsize
*             Find stepsize that gives rate on other side of "maxbits"
              IF (usedbits .GE. maxbits-MARGIN) THEN
                  DO WHILE (usedbits .GT. maxbits) ! Find larger stepsize for low rate
                      hi_step = step
                      hi_rate = usedbits
                      step = step * COARSE_RATIO
                      CALL gain_bits (gain, gain1, m,mhor, step,
                                      depth,depth1, .FALSE., usedbits, qz_index, m*n)
                      TYPE *,'step =', step, '   usedbits =', usedbits
                  END DO
                  lo_step = step
                  lo_rate = usedbits
              ELSE              ! Find smaller stepsize for higher rate
                  DO WHILE (usedbits .LE. maxbits)
                      lo_step = step
                      lo_rate = usedbits
                      step = step / COARSE_RATIO
                      CALL gain_bits (gain, gain1, m,mhor, step,
                                      depth,depth1, .FALSE., usedbits, qz_index, m*n)
                      TYPE *,'step =', step, '   usedbits =', usedbits
                  END DO
                  hi_step = step
                  hi_rate = usedbits
              END IF
*             Iterate using binary search
              iter = 0
              DO WHILE (iter .LT. MAX_ITER  .AND.  lo_rate .LT. maxbits-MARGIN)
                  iter = iter + 1
                  step = (hi_step + lo_step) / 2.
                  CALL gain_bits (gain, gain1, m,mhor, step,
                                  depth,depth1, .FALSE., usedbits, qz_index, m*n)
                  TYPE *,'step =', step, '   usedbits =', usedbits
                  IF (usedbits .GT. maxbits) THEN
                      hi_step = step
                      hi_rate = usedbits
                  ELSE
                      lo_step = step
                      lo_rate = usedbits
                  END IF
              END DO
              step = lo_step
          END IF
***       TYPE *,'Now, let''s do the final quantization'
          CALL gain_bits (gain, gain1, m,mhor, step,
                          depth,depth1, .TRUE., usedbits, qz_index, m*n)
***       TYPE *,'step =', step, '   usedbits =', usedbits
***********************************************************************
```

```
      ELSE      ! No gain qz.
         usedbits = 0
      END IF

* Reconstruct
      start = 2**(depth-1) - 1
      start1 = 2**(depth1-1) - 1
      IF (step .GT. max_step) THEN
         TYPE *,'Limit reconstr. step to',max_step,'     Multiply by',
     -      max_step/step
         DO i = 0,m-1
            gain1(i) = gain1(i) * max_step/step
            gain(i) = gain(i) * max_step/step
         END DO
      END IF
      DO i = 0,m-1
       IF (gain1(i) .GT. gain(i)) THEN
          ptr = start1 + index1(i)/2
          bit0 = MOD(index1(i),2)
          DO icomp = 0,n-1
             x(icomp,i) = gain1(i) * code(icomp,bit0,ptr)
          END DO
       ELSE
          ptr = start + index(i)/2
          bit0 = MOD(index(i),2)
          DO icomp = 0,n-1
             x(icomp,i) = gain(i) * code(icomp,bit0,ptr)
          END DO
       END IF
      END DO
* Write qz and vector indices to file
      CALL write_codes (m, depth, depth1, qz_index, index)

RETURN
      END

* gain_bits - Gain quantization and coding
*      July 21, 1986:  Ask for qz parms for each "level" encountered
*      Sept. 2, 1986:  Complete qz. characteristic /SE
*      Jan. 2, 1987:   Put symbol counters in COMMON area /SE
      SUBROUTINE gain_bits (gain, gain1, m, mhor, step, depth, depth1,
     -                     quantize, usedbits, qz_index, mn)
      IMPLICIT NONE
      INTEGER m, mhor, usedbits, depth, depth1, qz_index(0:m-1), mn
      REAL gain(0:m-1), gain1(0:m-1), step
      LOGICAL quantize          ! Indicates whether final qz is done, i.e.,
                                ! quantized gain returned and counters updated
      PARAMETER M_MAX=256*240/4
      REAL junk(0:M_MAX-1), junk1(0:M_MAX-1), levbits
      PARAMETER INIT_COUNT=3
      INCLUDE 'GAINCNT.CMN/LIST'
      INTEGER prev_index(0:M_MAX-1), prev_mhor/0/, vecbits, locbits
      INTEGER lev, bit(MAXLEV), size(MAXLEV), nlev/0/, i
      REAL ts_ratio(MAXLEV), rec1(MAXLEV), rec2(MAXLEV),
     -     step_cut(MAXLEV), step_max(MAXLEV), alpha(MAXLEV), out_step

* Identify size to find appropriate counters
      lev = 0
      DO i = 1,nlev
         IF (size(i) .EQ. mn) THEN
            lev = i
         END IF
      END DO
      IF (lev .EQ. 0) THEN     ! Record this size
         nlev = nlev + 1
         IF (nlev .GT. MAXLEV)  STOP 'GAIN_BITS -- Too many sizes'
         size(nlev) = mn
         lev = nlev
         DO i = 0, NCOND - 1
            count(0,i,nlev) = INIT_COUNT
            count(1,i,nlev) = INIT_COUNT
         END DO
*        Prompt for qz. characteristic
         TYPE *,'GAIN_BITS -- Encountered m*n =', mn
         CALL iget('# bits:', bit(nlev))
         IF (bit(nlev) .GT. MAXBITS)  STOP 'GAIN_BITS -- Too many bits'
```

```
      CALL rget ('GAIN_BITS -- ts_ratio, rec1, rec2 [1.,0.,0.]:',
                 ts_ratio(nlev), rec1(nlev), rec2(nlev))
      IF (ts_ratio(nlev) .LT. 1.E-6)  ts_ratio(nlev) = 1.
      CALL rget('step_cut, step_max, alpha:',
                 step_cut(nlev), step_max(nlev), alpha(nlev))
      DO i = 0, 2**bit(nlev) - 2
         levcnt(0,i,nlev) = INIT_COUNT
         levcnt(1,i,nlev) = INIT_COUNT
      END DO
   END IF
   DO i = 0, NCOND - 1
      count(0,i,0) = count(0,i,lev)
      count(1,i,0) = count(1,i,lev)
   END DO
   DO i = 0, 2**bit(lev) - 2
      levcnt(0,i,0) = levcnt(0,i,lev)
      levcnt(1,i,0) = levcnt(1,i,lev)
   END DO

* Quantize
   IF (quantize) THEN
      CALL gain_qz (gain,gain1, m, mhor, step, depth,depth1,
                    gain,gain1, vecbits, qz_index, 2**bit(lev),
                    ts_ratio(lev), rec1(lev), rec2(lev))
      out_step = AMIN1 (step, step_max(lev),
                    step_cut(lev) + alpha(lev)*(step-step_cut(lev)))
      TYPE *,'Reconstr. step =',out_step,'   Multiply by',
             out_step/step
      DO i = 0,m-1
         gain1(i) = gain1(i) * out_step/step
         gain(i) = gain(i) * out_step/step
      END DO
   ELSE    ! Don't change values of gains
      IF (m .GT. M_MAX)  STOP 'GAIN_BITS -- Too many gains'
      CALL gain_qz (gain,gain1, m, mhor, step, depth,depth1,
                    junk,junk1, vecbits, qz_index, 2**bit(lev),
                    ts_ratio(lev), rec1(lev), rec2(lev))
   END IF
* Variable length coding of gains
   IF (prev_mhor .GE. mhor  .OR.  prev_mhor .EQ. 0) THEN
      prev_mhor = mhor
      DO i = 0,m-1
         prev_index(i) = 0
      END DO
   END IF
   CALL CODE_LOCS (qz_index, mhor, mhor, m/mhor,
           prev_index, prev_mhor, count(0,0,0), locbits)
   levbits = 0.
   DO i = 0,m-1
      IF (qz_index(i) .GT. 0) THEN
         CALL AD_CODER (qz_index(i)-1, bit(lev), levcnt(0,0,0), levbits)
      END IF
   END DO
   usedbits = NINT(levbits) + locbits + vecbits
   IF (quantize) THEN        ! Update counters and save indices
      DO i = 0, NCOND - 1
       count(0,i,lev) = count(0,i,0)
       count(1,i,lev) = count(1,i,0)
      END DO
      DO i = 0, 2**bit(lev) - 2
       levcnt(0,i,lev) = levcnt(0,i,0)
       levcnt(1,i,lev) = levcnt(1,i,0)
      END DO
      DO i = 0,m-1
       prev_index(i) = qz_index(i)
      END DO
      prev_mhor = mhor
   END IF

RETURN
   END
```

```
* gain_qz -  Gain quantizer
*.      May 12, 1986:   Reconstruction level at lower threshold value.
*                       Delete isolated 1's.
*       May 19, 1986:   Use fewer bits for 1's.
*       May 20, 1986:   New parameter "mhor"
*       June 27, 1986:  Return qz indices.
*       July 15, 1986:  Modified for external gain coding
*       July 17, 1986:  Prompt for qz characteristic
*       July 21, 1986:  Qz parms provided by calling routine
*       April 7, 1987:  No 1's suppression for scalar qz (depth=1).
        SUBROUTINE gain_qz (gain, gain1, m, mhor, step, depth, depth1,
     -                      out, out1, usedbits, qz_index, max_index,
     -                      ts_ratio, rec1, rec2)
        IMPLICIT NONE
        INTEGER m, mhor, usedbits, depth, depth1, qz_index(0:m-1), max_index
        REAL gain(0:m-1), gain1(0:m-1), step, out(0:m-1), out1(0:m-1)
        REAL thresh, thresh1
        INTEGER index, i
        PARAMETER EPSILON=1.E-3
        INTEGER blocks_per_line, blocks_per_column, nskip
        LOGICAL firstpass/.TRUE./
        REAL ts_ratio, rec1, rec2
***     SAVE firstpass, ts_ratio, rec1, rec2

IF (firstpass) THEN
           firstpass = .FALSE.
***        CALL rget ('GAIN_QZ -- ts_ratio, rec1, rec2 [1.,0.,0.]:',
***     -                      ts_ratio, rec1, rec2)
***        IF (ts_ratio .LT. 1.E-6)  ts_ratio = 1.
        END IF
        IF (step .LT. EPSILON) THEN       ! No quantization
           DO i = 0,m-1
              out(i) = gain(i)
              out1(i) = 0.
              qz_index(i) = 0
           END DO
           usedbits = 0
        ELSE                              ! Quantize
           usedbits = 0
           thresh = TS_RATIO * step
           thresh1 = thresh + step
     -     DO i = 0,m-1
              IF (gain(i) .LE. thresh1 .AND. gain1(i) .LE. thresh) THEN
* Set to zero
                 out(i) = 0.
                 out1(i) = 0.
                 index = 0
              ELSE IF (gain(i) .GT. thresh1) THEN      ! Index > 1
                 index = (gain(i) - thresh) / step + 1.
                 index = MIN0 (index, MAX_INDEX)
                 out(i) = thresh + step * (FLOAT(index) - 1. + rec2)
                 out1(i) = out(i) - EPSILON
                 IF (index .LE. 1)  STOP 'GAIN_QZ -- Program error'
                 usedbits = usedbits + depth
              ELSE
                 index = 1
                 out1(i) = thresh + step * rec1
                 out(i) = 0.
                 usedbits = usedbits + depth1
              END IF
              qz_index(i) = index
           END DO
* Delete isolated zeros
           blocks_per_line = mhor
           blocks_per_column = m / blocks_per_line
           IF (blocks_per_column * blocks_per_line  .NE. m) THEN
              TYPE *,'GAIN_QZ -- Bad blocks_per_line; skipping block reject'
           ELSE IF (depth .GT. 1) THEN
              CALL reject_single (out1, blocks_per_line, blocks_per_column,
     -                    thresh + step*rec1 - EPSILON,
     -                    thresh + step*rec1 + EPSILON, nskip, qz_index)
              usedbits = usedbits - nskip * depth1
           ELSE
              TYPE *,'GAIN_QZ -- No rejection for scalar qz.'
           END IF
```

```
      END IF

RETURN
      END
* reject_single - Set element to zero if sum of 8-connected neighbors is
*       less than "thresh".  Routine assumes non-negative values.
      SUBROUTINE reject_single (array, n1,n2, lo_thresh, hi_thresh, nskip,
                                qz_index)
      IMPLICIT NONE
      INTEGER n1,n2, nskip, qz_index(0:n1-1, 0:n2-1)
      REAL array(0:n1-1, 0:n2-1), lo_thresh, hi_thresh
      INTEGER i1,i2
      REAL sum nskip = 0
      DO i2 = 0,n2-1
      DO i1 = 0,n1-1
         IF (array(i1,i2).GE.lo_thresh .AND. array(i1,i2).LT.hi_thresh) THEN
* Check neighbors
            sum = 0.
            IF (i1 .GT. 0)    sum = sum + array(i1-1,i2)
            IF (i1 .LT. n1-1) sum = sum + array(i1+1,i2)
            IF (i2 .GT. 0) THEN
               sum = sum + array(i1,i2-1)
               IF (i1 .GT. 0)    sum = sum + array(i1-1,i2-1)
               IF (i1 .LT. n1-1) sum = sum + array(i1+1,i2-1)
            END IF
            IF (i2 .LT. n2-1) THEN
               sum = sum + array(i1,i2+1)
               IF (i1 .GT. 0)    sum = sum + array(i1-1,i2+1)
               IF (i1 .LT. n1-1) sum = sum + array(i1+1,i2+1)
            END IF
            IF (sum .LT. lo_thresh) THEN
               array(i1,i2) = 0.
               qz_index(i1,i2) = 0
               nskip = nskip + 1
            END IF
         END IF
      END DO
      END DO
***   TYPE *,'REJECT_SINGLE -- nskip =',nskip RETURN
      END
c*************************************************************************
c
c     LOWRES_REAL.FOR        PicTel Corporation       May 15, 1986
c
c     PROPRIETARY AND COMPANY PRIVATE:   NOT FOR RELEASE
c
c*************************************************************************
c
c     Staffan Ericsson
c
c
c     LOWRES.FOR reduces the resolution of the input image by
c     half using a separable symmetric 4x4 prefilter.
c SUBROUTINE lowres_real (in, npels, nlines, out)
      IMPLICIT NONE
      INTEGER npels, nlines
      REAL in(0:npels-1,0:nlines-1), out(0:npels/2-1,0:nlines/2-1)
      INTEGER i,j, left,right, up,down
      REAL center, corners, rest, hi,lo
      LOGICAL first_pass /.TRUE./
      SAVE hi, lo, first_pass IF (MOD(nlines,2) .NE. 0 .OR. MOD(npels,2) .NE. 0) STOP
     -        'LOWRES_REAL -- Size must be even'
      IF (first_pass) THEN
         CALL rget ('LOWRES_REAL -- Peripheral weighting? [0.]:', lo)
         hi = 0.5 - lo
         first_pass = .FALSE.
```

```
      END IF
      DO j = 0,nlines-1,2
         up = MAX (0,j-1)
         down = MIN (nlines-1,j+2)
         DO i = 0,npels-1,2
            left = MAX (0,i-1)
            right = MIN (npels-1,i+2)
            center = in(i,j) + in(i+1,j) +
                     in(i,j+1) + in(i+1,j+1)
            corners = in(left,up) + in(right,up) +
                      in(left,down) + in(right,down)
            rest = in(i,up) + in(i+1,up) +
                   in(left,j) + in(right,j) +
                   in(left,j+1) + in(right,j+1) +
                   in(i,down) + in(i+1,down)
            out(i/2,j/2) = hi*hi * center + lo*lo * corners + lo*hi * rest
         END DO
      END DO RETURN
      END
c****************************************************************
c
c     UPRES.FOR        PicTel Corporation        January 20, 1985
c
c     PROPRIETARY AND COMPANY PRIVATE:  NOT FOR RELEASE
c
c****************************************************************
c
c     Jeff Bernstein
c
c
c     UPRES.FOR generates a full resolution image by bilinear
c     interpolation
c
c     System for naming variables:
c     Lower case signifies a simple "name," not necessarily conforming
c     to convention.  Upper case letters, which should preceed any
c     lowers, conform to this convention:
c
c          X-or-Y:        Refers to horizontal (X) or vertical (Y)
c
c     Subroutine UPRES arguments:
c          in       - (input) low resolution input image
c          Ximsz    - (input) horizontal output image size
c          Yimsz    - (input) vertical output image size
c          out      - (output) high resolution output image SUBROUTINE upres_real(in,Ximsz,Yimsz,out)
      IMPLICIT NONE
      INTEGER Ximsz,Yimsz,Xpel,Ypel,Xpix,Ypix
      REAL in(Ximsz/2,Yimsz/2),out(Ximsz,Yimsz)
      REAL hi,lo
      PARAMETER (hi=0.75,lo=0.25)

* Horizontal interpolation
      DO 100 Ypel=1,Yimsz/2
         out(1,Ypel) = in(1,Ypel)
         out(Ximsz,Ypel) = in(Ximsz/2,Ypel)
         DO 100 Xpel=1,Ximsz/2-1
            Xpix=2*Xpel
            out(Xpix,Ypel)=hi*in(Xpel,Ypel)+lo*in(Xpel+1,Ypel)
            out(Xpix+1,Ypel)=lo*in(Xpel,Ypel)+hi*in(Xpel+1,Ypel)
         CONTINUE
* Vertical interpolation
      CALL vcopy (out(1,Yimsz/2), out(1,Yimsz), Ximsz) ! Last line
      DO 200 Ypel= Yimsz/2-1, 1, -1
         Ypix=2*Ypel
         DO 200 Xpel=1,Ximsz
            out(Xpel,Ypix+1) = lo*out(Xpel,Ypel)+hi*out(Xpel,Ypel+1)
            out(Xpel,Ypix) = hi*out(Xpel,Ypel)+lo*out(Xpel,Ypel+1)
200      CONTINUE

RETURN
      END
```

* rform_vectors - Reformat real image into vectors
      SUBROUTINE rform_vectors (im, npels, nlines, nh, nv, hsize,vsize, x)
      IMPLICIT NONE
      INTEGER npels, nlines, nh,nv, hsize,vsize
      REAL im(0:npels-1,0:nlines-1)
      REAL x(0:hsize-1,0:vsize-1,0:nh-1,0:nv-1)
      INTEGER i,j,i1,j1

DO j = 0,nv-1
      DO i = 0,nh-1
         DO j1 = 0,vsize-1
         DO i1 = 0,hsize-1
            x(i1,j1,i,j) = im(i1+hsize*i,j1+vsize*j)
         END DO
         END DO
      END DO
      END DO

RETURN
      END

* rform_image - Reformat vectors into real image
      SUBROUTINE rform_image (im, npels, nlines, nh, nv, hsize,vsize, x)
      IMPLICIT NONE
      INTEGER npels, nlines, nh,nv, hsize,vsize
      REAL im(0:npels-1,0:nlines-1)
      REAL x(0:hsize-1,0:vsize-1,0:nh-1,0:nv-1)
      INTEGER i,j,i1,j1

DO j = 0,nv-1
      DO i = 0,nh-1
         DO j1 = 0,vsize-1
         DO i1 = 0,hsize-1
            im(i1+hsize*i,j1+vsize*j) = x(i1,j1,i,j)
         END DO
         END DO
      END DO
      END DO

RETURN
      END

* scalar_codec - Perform scalar qz.
*       June 27, 1986: Removed check for too_few_bits.
*       July 16, 1986: Removed "change" from parm list.
      SUBROUTINE scalar_codec (im, hsize,vsize, maxbits, usedbits,
                              stepmin, stepmax)
      IMPLICIT NONE
      INTEGER hsize, vsize, maxbits, usedbits
      REAL im(0:hsize-1, 0:vsize-1), stepmin, stepmax
      PARAMETER M_MAX=32*45
      REAL code(0:2) /1.,-1.,2./, cum(0:1)
      INTEGER count(0:1), n, depth IF (hsize*vsize .GT. M_MAX)
              STOP 'SCALAR_CODEC -- Too large array'
      TYPE *,'SCALAR_CODEC -- maxbits =',maxbits
* Perform VQ
      n = 1
      depth = 1
      CALL do_the_vq (im, n, hsize,vsize, code, depth,
              cum, count, maxbits, usedbits, stepmin, stepmax)
      TYPE *,'SCALAR_CODEC -- usedbits =',usedbits

RETURN
      END

* vq_bin - Perform vector qz. using binary searched codebook
      INTEGER FUNCTION vq_bin (x,n, code, depth, dist, gain)
      IMPLICIT NONE
      INTEGER n, depth
      REAL x(0:n-1), code(0:n-1,0:2,0:2**depth-2), dist, gain
      INTEGER level, start, ptr, icomp, bit0
      REAL vdot vq_bin = 0
      DO level = 0,depth-1

```
                start = 2**level - 1           ! Start of codebook at level "level"
                ptr = start + vq_bin
                vq_bin = 2 * vq_bin
                IF (vdot(x, code(0,2,ptr), n) .LT. 0)  vq_bin = vq_bin + 1
***             TYPE *,'ptr =',ptr
***             TYPE *,'vdot =', vdot(x, code(0,2,ptr), n)
***             TYPE *,'vq_bin =',vq_bin
            END DO
* Codeword is found in code(*,MOD(vq_bin,2),ptr),
* where ptr = 2**(depth-1) - 1 + vq_bin/2
            bit0 = MOD(vq_bin,2)
            gain = vdot(x, code(0,bit0,ptr), n)
            gain = AMAX1 (gain,0.)   ! Don't allow negative gains
***         TYPE *,'gain =',gain
***         TYPE *,'rms =',SQRT(vdot(x,x,n))
            dist = 0.
            DO icomp = 0,n-1
                dist = dist + (x(icomp) - gain * code(icomp,bit0,ptr))**2
            END DO
***         TYPE *,'dist =',dist

RETURN
            END

* vq_bin_2 - Perform vector qz. using binary searched codebook with
*           two different depths
            INTEGER FUNCTION vq_bin_2 (x,n, code, depth, dist, gain,
     -                                 depth1, index1, gain1)
            IMPLICIT NONE
            INTEGER n, depth
            REAL x(0:n-1), code(0:n-1,0:2,0:2**depth-2), dist, gain, gain1
            INTEGER depth1, index1
            INTEGER start, ptr, bit0
            REAL vdot
            INTEGER vq_bin vq_bin_2 = VQ_BIN (x,n, code, depth, dist, gain)
            IF (depth1 .GT. depth  .OR.  depth1 .LE. 0) THEN
                STOP 'VQ_BIN_2 -- Bad argument "depth1"'
            ELSE
                start = 2**(depth1-1) - 1
                index1 = vq_bin_2 / (2 ** (depth-depth1))
                ptr = start + index1 / 2
                bit0 = MOD(index1,2)
                gain1 = vdot(x, code(0,bit0,ptr), n)
                gain1 = AMAX1 (gain1,0.)     ! Don't allow negative gains
            END IF

RETURN
            END

* vq_codec - Perform vector qz.
*       June 27, 1986: Removed check for too_few_bits.
*       July 7, 1986:  Prompt for blocksize and shifts.
*       July 17, 1986: Handle Y/I/Q components.
*       July 25, 1986: Fixed bug in chroma rearrangement
            SUBROUTINE vq_codec (im, hsize,vsize, Iim,Qim, iq_hsize, iq_vsize,
     -                           maxbits, usedbits, stepmin, stepmax)
            IMPLICIT NONE
            INTEGER hsize, vsize, maxbits, usedbits, iq_hsize, iq_vsize
            REAL im(0:hsize-1, 0:vsize-1), stepmin, stepmax,
     -           Iim(0:iq_hsize-1,0:iq_vsize-1), Qim(0:iq_hsize-1,0:iq_vsize-1)
            PARAMETER MN_MAX=256*360, CHROMA_MAX=128*120
            REAL x(0:MN_MAX-1), iq(0:2*CHROMA_MAX-1)
            INTEGER i, j, mhor, mvert, seed/0/, hshift, vshift, iq_mvert
            INCLUDE 'CODEBOOK.CMN/LIST'
            PARAMETER MAX_SHIFT=100
            INTEGER hblk, vblk, shifts (0:1, 0:MAX_SHIFT-1), nshift
            LOGICAL firstpass/.TRUE./
            SAVE seed, hblk,vblk, shifts, nshift, firstpass IF (firstpass) THEN
                firstpass = .FALSE.
                CALL iget ('VQ_CODEC -- hblk, vblk:', hblk, vblk)
                CALL iget ('VQ_CODEC -- # shifts:', nshift)
```

```
            IF (nshift .GT. MAX_SHIFT) STOP 'VQ_CODEC -- Too many shifts'
            DO i = 0,nshift-1
                CALL iget ('Enter shift (h,v):', shifts(0,i), shifts(1,i))
            END DO
         END IF
         IF (hblk*vblk .NE. n_vq) STOP 'Wrong VQ blocksize'
         TYPE *,'VQ_CODEC -- maxbits =',maxbits
* Decide "phase shift"
         IF (hsize .LT. 256  .OR.  nshift .LE. 0) THEN
            hshift = 0
            vshift = 0
            mhor = hsize / hblk
            mvert = vsize / vblk
            iq_mvert = iq_vsize / vblk
         ELSE
            hshift = shifts(0,seed)
            vshift = shifts(1,seed)
            seed = MOD (seed+1, nshift)
            TYPE *, 'hshift =', hshift, '     vshift =',vshift
            mhor = (hsize-1) / hblk
            mvert = (vsize-1) / vblk
            iq_mvert = (iq_vsize-1) / vblk
            IF (mhor*hblk + hshift .GT. hsize  .OR.
     -          mvert*vblk + vshift .GT. vsize) THEN
               STOP 'VQ_CODEC -- Shifts extend outside picture'
            END IF
            IF (2*iq_hsize .GT. hsize ..OR.
     -          iq_mvert*vblk + vshift .GT. iq_vsize) THEN
               STOP 'VQ_CODEC -- Shifts extend outside chroma'
            END IF
         END IF
* Rearrange blocks into vectors
         IF (mhor * (mvert + iq_mvert) * hblk*vblk  .GT. MN_MAX)
     -          STOP 'VQ_CODEC -- Too large array'

CALL rform_vectors (im(hshift,vshift), hsize,vsize, mhor, mvert,
     -          hblk,vblk, x)
* Rearrange chroma
         IF (hsize * iq_vsize  .GT.  2 * CHROMA_MAX)  STOP
     -                'VQ_CODEC -- Too large chroma arrays'
         DO j = 0,iq_vsize-1
            DO i = 0,iq_hsize-1
               iq(i+j*hsize) = Iim(i,j)
               iq(i+iq_hsize+j*hsize) = Qim(i,j)
            END DO
            DO i = 2*iq_hsize, hsize-1
               iq(i+j*hsize) = 0.
            END DO
         END DO
         CALL rform_vectors (iq(hshift+hsize*vshift), hsize, iq_vsize,
     -          mhor, iq_mvert, hblk,vblk, x(mhor*mvert * hblk*vblk))
* Reset image
         CALL zer (im, hsize*vsize)
         CALL zer (iq, hsize*iq_vsize)
* Perform VQ
         CALL do_the_vq (x, n_vq, mhor, mvert+iq_mvert, code, depth_vq,
     -          cum, count, maxbits, usedbits, stepmin, stepmax)
         CALL rform_image (im(hshift,vshift), hsize,vsize, mhor, mvert,
     -                                                    hblk,vblk, x)
         CALL rform_image (iq(hshift+hsize*vshift), hsize, iq_vsize,
     -          mhor, iq_mvert, hblk,vblk, x(mhor*mvert * hblk*vblk))
* Rearrange chroma
         DO j = 0,iq_vsize-1
            DO i = 0,iq_hsize-1
               Iim(i,j) = iq(i+j*hsize)
               Qim(i,j) = iq(i+iq_hsize+j*hsize)
            END DO
         END DO TYPE *,'VQ_CODEC -- usedbits =',usedbits

RETURN
         END
```

```
* vcopy - copy real array
      SUBROUTINE vcopy ( ,y,n)
      IMPLICIT NONE
      INTEGER n
      REAL x(0:*), y(0:*)
      INTEGER i DO i = 0,n-1
         y(i) = x(i)
      END DO
      RETURN
      END

* vsub - subtract two arrays
      SUBROUTINE vsub (x,y,z,n)
      IMPLICIT NONE
      INTEGER n
      REAL x(0:*), y(0:*), z(0:*)
      INTEGER i DO i = 0,n-1
         z(i) = x(i) - y(i)
      END DO
      RETURN
      END

* vadd - add two arrays
      SUBROUTINE vadd (x,y,z,n)
      IMPLICIT NONE
      INTEGER n
      REAL x(0:*), y(0:*), z(0:*)
      INTEGER i DO i = 0,n-1
         z(i) = x(i) + y(i)
      END DO
      RETURN
      END

* acc - add second array to first array
      SUBROUTINE vacc (x,y,n)
      IMPLICIT NONE
      INTEGER n
      REAL x(0:*), y(0:*)
      INTEGER i DO i = 0,n-1
         x(i) = x(i) + y(i)
      END DO
      RETURN
      END

* vdot - return scalar product
      REAL FUNCTION vdot (x,y,n)
      IMPLICIT NONE
      INTEGER n
      REAL x(0:*), y(0:*)
      INTEGER i vdot = 0.
      DO i = 0,n-1
         vdot = vdot + x(i) * y(i)
      END DO
      RETURN
      END

* zer - Set vector to zero
      SUBROUTINE zer (x,n)
      IMPLICIT NONE
      INTEGER n
      REAL x(0:n-1)
      INTEGER i DO i = 0,n-1
         x(i) = 0.
      END DO

RETURN
      END

* Add warped HF selectively, sending side info; return result in "Ywarp"
*     July 15, 1986:  Transmit filter info using arithmetic coding.
*     July 17, 1986:  Changed parameter list and removed BE filtering
*     Jan. 2, 1987:   Place symbol counters in common areas /SE
      SUBROUTINE weight_warp_y (YLout_up, YLwarp_up, Ywarp,
     -                          hsize, vsize, maxbits, Yorig, usedbits)
      IMPLICIT NONE
      INTEGER hsize, vsize, maxbits, usedbits
      REAL YLout_up(0:hsize-1,0:vsize-1), YLwarp_up(0:hsize-1,0:vsize-1),
     -     Ywarp(0:hsize-1,0:vsize-1), Yorig(0:hsize-1,0:vsize-1)
      REAL fweight, err0, err1
      PARAMETER RHUGE=1.E10, VBLKSIZE=8, HBLKSIZE=VBLKSIZE
      PARAMETER MAXHOR=256, MAXVERT=240
      INTEGER i,j, ii,jj, iblk,jblk, n0, ncut, nhier,
     -        skip(0:MAXHOR/HBLKSIZE,0:MAXVERT/VBLKSIZE),
     -        prev_skip(0:MAXHOR/HBLKSIZE,0:MAXVERT/VBLKSIZE), prev_hsize
      LOGICAL firstpass/.TRUE./, spread
      CHARACTER yesno*1
      SAVE firstpass, fweight, spread TYPE *,'WEIGHT_WARP -- hsize =', hsize
      IF (firstpass) THEN
         firstpass = .FALSE.
         CALL rget ('WEIGHT_WARP_Y -- Filter weighting [1.2]:', fweight)
         IF (fweight .LT. 1.E-6) fweight = 1.2
         CALL strget ('Spread filter to lower levels? [Y/N]', yesno)
         IF (yesno .EQ. 'Y' .OR. yesno .EQ. 'y') THEN
            spread = .TRUE.
         ELSE
            spread = .FALSE.
         END IF
      END IF
      usedbits = 0
      n0 = 0  ! Blocks using warped HF
```

```
         ncut = 0            ! Warped HF eliminated from this level
         nhier = 0           ! Warped HF eliminated from higher level
         IF (prev_hsize .GE. hsize  .OR.  prev_hsize .EQ. 0) THEN ! We are at top level
            prev_hsize = hsize
            DO j = 0,(vsize-1)/VBLKSIZE
            DO i = 0,(hsize-1)/HBLKSIZE
               prev_skip(i,j) = 0
            END DO
            END DO
         END IF
* Estimation
         DO j = 0,vsize-1,VBLKSIZE
         DO i = 0,hsize-1,HBLKSIZE
            iblk = i / HBLKSIZE
            jblk = j / VBLKSIZE
            IF (prev_skip(iblk/2,jblk/2) .EQ. 0  .OR.  .NOT.spread) THEN ! Do estimation
               err0 = 0.          ! MSE with warped HF
               err1 = 0.          ! MSE without warped HF
               DO jj = j, MIN(j+VBLKSIZE-1, vsize-1)
               DO ii = i, MIN(i+HBLKSIZE-1, hsize-1)
                  err0 = err0 + (YLout_up(ii,jj) + Ywarp(ii,jj) -
     -                           YLwarp_up(ii,jj) - Yorig(ii,jj)) ** 2
                  err1 = err1 + (YLout_up(ii,jj) - Yorig(ii,jj)) ** 2
               END DO
               END DO
               IF (err1 * fweight  .LT. err0) THEN       ! Skip warped HF
                  skip(iblk,jblk) = 1
                  ncut = ncut + 1
               ELSE
                  skip(iblk,jblk) = 0
                  n0 = n0 + 1
               END IF
            ELSE                  ! Don't use warped HF
               skip(iblk,jblk) = 1
               nhier = nhier + 1
            END IF
         END DO
         END DO
* Code filter info
         CALL filt_info_coding_y (skip, 1+MAXHOR/HBLKSIZE, 1+(hsize-1)/HBLKSIZE,
     -          1+(vsize-1)/VBLKSIZE, prev_skip, 1+MAXHOR/HBLKSIZE, usedbits)
         IF (usedbits .GT. maxbits) THEN        ! Delete all warped HF
            usedbits = 1
            TYPE *,'WEIGHT_WARP_Y -- Deleting all warped HF'
            DO j = 0,(vsize-1)/VBLKSIZE
            DO i = 0,(hsize-1)/HBLKSIZE
               skip(i,j) = 1
            END DO
            END DO
         ELSE
            usedbits = usedbits + 1
         END IF
         DO j = 0,(vsize-1)/VBLKSIZE
         DO i = 0,(hsize-1)/HBLKSIZE
            prev_skip(i,j) = skip(i,j)
         END DO
         END DO
* Form prediction
         DO j = 0,vsize-1,VBLKSIZE
         DO i = 0,hsize-1,HBLKSIZE
            iblk = i / HBLKSIZE
            jblk = j / VBLKSIZE
            IF (skip(iblk,jblk) .EQ. 1) THEN     ! Skip warped HF
               DO jj = j, MIN(j+VBLKSIZE-1, vsize-1)
               DO ii = i, MIN(i+HBLKSIZE-1, hsize-1)
                  Ywarp(ii,jj) = YLout_up(ii,jj)
               END DO
               END DO
            ELSE                                 ! Use warped HF
               DO jj = j, MIN(j+VBLKSIZE-1, vsize-1)
               DO ii = i, MIN(i+HBLKSIZE-1, hsize-1)
                  Ywarp(ii,jj) = YLout_up(ii,jj) + Ywarp(ii,jj) -
     -                           YLwarp_up(ii,jj)
               END DO
               END DO
```

```
            END IF
         END DO
      END DO
      TYPE 900, n0,ncut,nhier,usedbits
900   FORMAT (1X,'WEIGHT_WARP_Y:   n0 =',I6,'   ncut =',I6,'   nhier =',I6/
     -        1X,'                 usedbits =',I6)
      prev_hsize = hsize      ! Save size
      RETURN
      END

* filt_info_coding - Adaptive coding of filter info
*     qz_index and prev_index are 0 or 1
      SUBROUTINE FILT_INFO_CODING_Y (qz_index, qzdim, mhor, mvert,
     -              prev_index, prevdim, usedbits)
      IMPLICIT NONE
      PARAMETER INIT_COUNT=3
      INCLUDE 'YFILTCNT.CMN/LIST'
      INTEGER mhor, mvert, qzdim, prevdim, qz_index(0:qzdim-1,0:mvert-1),
     -        prev_index(0:prevdim-1,0:(mvert-1)/2), usedbits
      INTEGER lev, size(MAXLEV), nlev/0/, i lev = 0
      DO i = 1,nlev
         IF (size(i) .EQ. mhor) THEN
            lev = i
         END IF
      END DO
      IF (lev .EQ. 0) THEN      ! Record this size
         nlev = nlev + 1
         size(nlev) = mhor
         lev = nlev
         DO i = 0, NCOND - 1
            count(0,i,nlev) = INIT_COUNT
            count(1,i,nlev) = INIT_COUNT
         END DO
         TYPE *,'FILT_INFO_CODING_Y -- Encountered hor =',mhor
      END IF
      CALL CODE_LOCS (qz_index, qzdim, mhor, mvert,
     -                prev_index, prevdim, count(0,0,lev), usedbits)
***   TYPE *,'FILT_INFO_CODING_Y -- mhor =',mhor,'    usedbits =',usedbits

RETURN
      END
```

APPENDIX B

```fortran
c
c       LWARP2.FOR      PicTel Corporation      February 9, 1985
c
c       PROPRIETARY AND COMPANY PRIVATE:  NOT FOR RELEASE
c
c*****************************************************************
c
c       Last updated on February 21, 1985
c
c       Brian L. Hinman
c
c       Warps the reconstructed luminance image
c       according to the coded vector field.
c
c       Argument are:
c           cXmo   -   (input) the coded X motion vectors.
c           cYmo   -   (input) the coded Y motion vectors.
c           Rlim   -   (input) the reconstructed luminance image to be
c                              warped by cXmo and cYmo.
c           WRlim  -   (output) the warped version of Rlim.
c           mwid   -   (input) the number of vectors horizontally.
c           mhei   -   (input) the number of vectors vertically.
c           w      -   (input) the vector interpolation function
c           mult   -   (input) multiplier on vector field Subroutine lwarp2 (cXmo, cYmo, Rlim, WRlim, mwid, mhei,
     *                   w2, mult)
c
c       The greatest debug tool since Pascal
c
        IMPLICIT NONE
c
c       Debug print level.  Not especially useful
c
        COMMON /debug/ prtlvl INTEGER mwid, mhei
        REAL cXmo (0:mwid+1, 0:mhei+1), cYmo (0:mwid+1, 0:mhei+1)
        BYTE Rlim (-15:272, -15:256), WRlim (-15:272, -15:256)
        REAL w2 (256/mwid, 240/mhei), mult
        REAL Xrelative, Yrelative, vx, vy, fracX, fracY
        INTEGER prtlvl
        INTEGER Xblock, Yblock, X, Y, X1, X2, Y1, Y2
        INTEGER Xres, Yres, sizX, sizY, Xtop, Ytop
        INTEGER vxint, vyint, Xmoved, Ymoved
c
c       sizX and sizY are the block size
c       Xtop and Ytop are used as limit+1 for the
c         'w' interpolation function.
c
        IF (prtlvl .GE. 1) TYPE *,'lwarp'
        sizX = 256/mwid
        sizY = 240/mhei
        Xtop = sizX + 1
        Ytop = sizY + 1
c
c       X and Y step through the luminance image
c
        DO 100 Y = 1, 240
c
c       Yblock is the Y warping region with respect to the
c          decimated 32x30 motion vector field.
c       Yrelative is the absolute location of the start of
c          the present warping region.
c       Yres is the residual offset within the present region
c
```

```
            Yblock = (Y + 0.5 * (sizY-1)) / sizY
            Yrelative = (Yblock-1) * sizY + sizY/2
            Yres = Y - Yrelative DO 100 X = 1, 256
c
c    Xblock is the X warping region with respect to the
c      decimated 32x30 motion vector field.
c    Xrelative is the absolute location of the start of
c      the present warping region.
c    Xres is the residual offset within the present region.
c IF (prtlvl .GE. 2) TYPE *,'lwarp pixel (x,y)',x,y
            Xblock = (X + 0.5 * (sizX-1)) / sizX
            Xrelative = (Xblock-1) * sizX + sizX/2
            Xres = X - Xrelative
c
c    Interpolate the vector field
c    w(x, y) is a 'raised cosine' function originally
c      created in the wcreate subroutine.
c    vx and vy are the components of the interpolated vector
c
            vx = w2(Xres,Yres)*cXmo(Xblock,Yblock) +
     *           w2(Xtop-Xres,Yres)*cXmo(Xblock+1,Yblock) +
     *           w2(Xres,Ytop-Yres)*cXmo(Xblock,Yblock+1) +
     *           w2(Xtop-Xres,Ytop-Yres)*cXmo(Xblock+1,Yblock+1)

vy = w2(Xres,Yres)*cYmo(Xblock,Yblock) +
     *           w2(Xtop-Xres,Yres)*cYmo(Xblock+1,Yblock) +
     *           w2(Xres,Ytop-Yres)*cYmo(Xblock,Yblock+1) +
     *           w2(Xtop-Xres,Ytop-Yres)*cYmo(Xblock+1,Yblock+1)
c
c    Scale the vector by 2 since it is for luma and
c    also scale by the multiplier in case we wish to
c    interpolate a frame.
c
            vx = vx * mult * 2.
            vy = vy * mult * 2.
c
c    vxint and vyint are the integerized versions of vx and vy
c    This +100 , -100 business is to make the integerize
c    property work correctly for negative numbers. Yes, folks,
c    there is a rounding function (JNINT) in FORTRAN that could be
c    used by subtracting 0.5, but this requires a subroutine call
c    and is therefore much less efficient.  So there.
c
            vxint = vx + 100
            vyint = vy + 100
            vxint = vxint - 100
            vyint = vyint - 100
c
c    fracY and fracX are the fractional pixel offsets
c
            fracY = vy - vyint
            fracX = vx - vxint
c
c    Xmoved and Ymoved are the integerized coordinates of
c      the moved pixel location on the 256x240 luma image.
c
            Xmoved = X + vxint
            Ymoved = Y + vyint
c
```

```
c       Warp the luminance image
c       Notice that NINT is used.  This prevents a systematic
c         offset of -1/2 LSB from being introduced.
c
              WRlim(X, Y) = NINT(
     *                        (1-fracX)*(1-fracY)*Rlim(Xmoved,Ymoved)
     *                      + fracX*(1-fracY)*Rlim(Xmoved+1,Ymoved)
     *                      + (1-fracX)*fracY*Rlim(Xmoved,Ymoved+1)
     *                      + fracX*fracY*Rlim(Xmoved+1,Ymoved+1))

100     CONTINUE

RETURN
        END
```

APPENDIX C

```
c
c       CWARP.FOR       PicTel Corporation       January 17, 1985
c
c       PROPRIETARY AND COMPANY PRIVATE:   NOT FOR RELEASE
c
c****************************************************************
c
c       Last updated on February 21, 1985
c
c       Brian L. Hinman
c
c       Warps the reconstructed chrominance images
c       according to the coded vector field.
c
c       This subroutine calls the subroutines:
c               vinterp
c               pelinterp
c
c       Argument are:
c           cXmo   -   (input) the coded X motion vectors.
c           cYmo   -   (input) the coded Y motion vectors.
c           Rqim   -   (input) the reconstructed 'Q' chroma image to be
c                              warped by cXmo and cYmo.
c           Riim   -   (input) the reconstructed 'I' chroma image to be
c                              warped by cXmo and cYmo.
c           WRqim  -   (output) the warped version of Rqim.
c           WRiim  -   (output) the warped version of Riim.
c           mwid   -   (input) the number of vectors horizontally.
c           mhei   -   (input) the number of vectors vertically.
c           w      -   (input) the vector interpolation function
c           mult   -   (input) multiplier on the vector field
c Subroutine cwarp (cXmo, cYmo, Rqim, Riim, WRqim,
     *                   WRiim, mwid, mhei, w, mult)

IMPLICIT NONE

COMMON /debug/ prtlvl

INTEGER mhei, mwid
        REAL cXmo (0:mwid+1, 0:mhei+1), cYmo (0:mwid+1, 0:mhei+1)
        BYTE Rqim (-7:136, -7:128), WRqim (-7:136, -7:128)
        BYTE Riim (-7:136, -7:128), WRiim (-7:136, -7:128)
        REAL w (128/mwid, 120/mhei), mult, vy, vx, fracX, fracY
        REAL Xrelative, Yrelative
        INTEGER vxint, vyint, Xmoved, Ymoved, prtlvl
        INTEGER Xblock, Yblock, X, Y, Xtop, Ytop
        INTEGER Xres, Yres, sizX, sizY
c
c       Figure out the block size
c
```

```
         sizX = 128/mwid
         sizY = 120/mhei
         Xtop = sizX + 1
         Ytop = sizY + 1
         IF (prtlvl.GE.1) TYPE *, 'cwarp'
         DO 100 Y = 1, 120

Yblock = (Y + 0.5 * (sizY-1)) / sizY
            Yrelative = (Yblock-1) * sizY + 2
            Yres = Y - Yrelative DO 100 X = 1, 128
               IF (prtlvl.GE.2) TYPE *,'cwarp pixel (x,y):', X, Y
               Xblock = (X + 0.5 * (sizX-1)) / sizX
               Xrelative = (Xblock-1) * sizX + 2
               Xres = X - Xrelative
c
c        Interpolate the vector field
c
               vx = w(Xres,Yres)*cXmo(Xblock,Yblock) +
     *              w(Xtop-Xres,Yres)*cXmo(Xblock+1,Yblock) +
     *              w(Xres,Ytop-Yres)*cXmo(Xblock,Yblock+1) +
     *              w(Xtop-Xres,Ytop-Yres)*cXmo(Xblock+1,Yblock+1)

vy = w(Xres,Yres)*cYmo(Xblock,Yblock) +
     *              w(Xtop-Xres,Yres)*cYmo(Xblock+1,Yblock) +
     *              w(Xres,Ytop-Yres)*cYmo(Xblock,Yblock+1) +
     *              w(Xtop-Xres,Ytop-Yres)*cYmo(Xblock+1,Yblock+1)
c
c        Scale the vector by the multiplier in case we
c        want an interpolated frame
c
               vx = vx * mult
               vy = vy * mult
c
c        Perform the pel 'warp' on the I and Q components
c
c        vxint and vyint are the integerized versions of vx and vy
c        This +100 , -100 business is to make the integerize
c        property work correctly for negative numbers. Yes, folks,
c        there is a rounding function (JNINT) in FORTRAN that could be
c        used by subtracting 0.5, but this requires a subroutine call
c        and is therefore much less efficient. So there.
c
               vxint = vx + 100
               vyint = vy + 100
               vxint = vxint - 100
               vyint = vyint - 100
c
c        fracY and fracX are the fractional pixel offsets
c
               fracY = vy - vyint
               fracX = vx - vxint Xmoved = X + vxint
               Ymoved = Y + vyint
               WRqim (X, Y) = NINT((1-fracX)*(1-fracY)*Rqim(Xmoved,Ymoved)
     *                       + fracX*(1-fracY)*Rqim(Xmoved+1,Ymoved)
     *                       + (1-fracX)*fracY*Rqim(Xmoved,Ymoved+1)
     *                       + fracX*fracY*Rqim(Xmoved+1,Ymoved+1))

WRiim (X, Y) = NINT((1-fracX)*(1-fracY)*Riim(Xmoved,Ymoved)
     *                       + fracX*(1-fracY)*Riim(Xmoved+1,Ymoved)
     *                       + (1-fracX)*fracY*Riim(Xmoved,Ymoved+1)
     *                       + fracX*fracY*Riim(Xmoved+1,Ymoved+1))
 100        CONTINUE
            RETURN
            END
```

APPENDIX D

```
************************* PicTel Corporation *************************
*
*        PROPRIETARY AND COMPANY PRIVATE:  NOT FOR RELEASE
*
* MODULE:         SUBROUTINE DECIDE_STATE
*
* DESCRIPTION:    Choose quantization state based on coded blocks
*                 in previous image, category map for new image,
*                 mean square prediction error in previous and new image,
*                 and quant. state in previous image.
*
* PARAMETERS:
*   (*) qstate          INTEGER; Contains quant. state used for previous
*                               frame when entering routine. Returns new value.
*       codedblocks     INTEGER; Number of coded blocks in prev. frame.
*       map             INTEGER (16,15); Block category assignment map.
*       tot_err         REAL; Mean square prediction error for new image
*       tot_err_prev    REAL; Mean square prediction error for previous ima
*       mode            INTEGER; Image mode for new frame
*   (*) goalblocks      INTEGER; Returns goal for number of coded blocks
*                               in new image
*
* ROUTINES REQUIRED:    None
*
* AUTHOR:       Staffan Ericsson
*
* DATE CREATED: June 16, 1985
*
* MODIFIED BY:
*       S. Ericsson  July 9, 1985:  Returning "goalblocks".
*       S Ericsson   Aug. 23, 1985: Using mean square error instead of
*               RMS, i.e., changing constant BETA to half the old value.
*       S Ericsson   Aug. 26, 1985: Routine returns "qstate" instead
*               of real-valued "qparam"
*       S Ericsson   July 23, 1986: Changed constants N_STATES,
*               QSTATE_ENTER_NORMAL, and QSTATE_LOWRES.
*.
        SUBROUTINE decide_state (qstate, codedblocks, map, tot_err,
     -                          tot_err_prev, mode, goalblocks)
        IMPLICIT NONE
        INCLUDE 'IMAGESIZE.PAR/LIST'
        INCLUDE 'CATS.PAR/LIST'
        INCLUDE 'MODES.PAR/LIST'
        INTEGER qstate, map(HBLKNUM,VBLKNUM), codedblocks, mode,
     -          goalblocks, Hblk, Vblk, imap, previous_mode
        REAL tot_err, tot_err_prev
        LOGICAL first_call /.TRUE./
        SAVE first_call, previous_mode
        INCLUDE 'HIMODE.CMN/LIST'
        PARAMETER BETA=6., GAMMA=6., N_STATES=48
        PARAMETER MARGIN = 15
        PARAMETER QSTATE_LOWRES=42, QSTATE_ENTER_NORMAL=N_STATES-1 goalblocks = 0
        IF (first_call) THEN       ! Don't change qstate at first call
          first_call = .FALSE.
        ELSE IF (mode .NE. NORMAL_MODE) THEN    ! Overload or build-up mode
          qstate = QSTATE_LOWRES
        ELSE IF (previous_mode .NE. NORMAL_MODE) THEN
          qstate = QSTATE_ENTER_NORMAL
        ELSE                       ! Normal mode in new and previous frame
* Compute blocks in cat. 1 and 2 (goal for number of coded blocks)
          DO Hblk = 1,HBLKNUM
            DO Vblk = 1,VBLKNUM
              imap = map(Hblk,Vblk)
```

```
          IF (imap.EQ.CAT_MOVING .OR. imap.EQ.CAT_ENERGY)
              goalblocks=goalblocks+1
          END DO
        END DO
        goalblocks = MIN0 (goalblocks, n1234-MARGIN)
* Account for change in energy
* Compare present goal with coded blocks in previous frame
        qstate = qstate + NINT (BETA * (tot_err/AMAX1(1.,tot_err_prev)-1.
            GAMMA * (FLOAT(goalblocks)/FLOAT(MAX0(20,codedblocks))-1.))
* Decrease state if we ran out of blocks
        IF (codedblocks .EQ. n1234) THEN     ! Ran out of blocks
           qstate = qstate - 1
        END IF
* Limit result to allowed range
        IF (qstate .LT. 0) qstate = 0
        IF (qstate .GE. N_STATES) qstate = N_STATES-1
      END IF
      previous_mode = mode

RETURN
      END
```

APPENDIX E

```
********************* PicTel Corporation *************************
*
*       PROPRIETARY AND COMPANY PRIVATE:   NOT FOR RELEASE
*
* MODULE:        INTEGER FUNCTION QUADCODE
*
* DESCRIPTION:   Performs quadtree coding of an NxN block, N=2**level.
*                Returns the top-level quadword value.
*
* PARAMETERS:
*       blk         INTEGER (bdim,2**level)  Block to be coded.
*       bdim        INTEGER  First dimension of "blk". Facilitates
*                   in-place computations.
*       level       INTEGER  2-log of blocksize N
*       code_len    INTEGER (-cdim:cdim,0:level)  Contains codeword
*                   lengths for the different levels in the hierarchy.
*       cdim        INTEGER  Max magnitude of codeword value
*   (*) code_hist   INTEGER (-cdim:cdim,0:level)  Codeword histograms;
*                   updated for every call.
*   (*) bits        INTEGER  The number of used bits is added to this
*                   variable.
*       code_words  INTEGER (-cdim:cdim,0:level)  Contains codewords
*                   for the different levels in the hierarchy.
*   (*) words       INTEGER (4**(level+1) /3)  Returns the codewords;
*                   the words must be transmitted in reverse order.
*   (*) lengths     INTEGER (4**(level+1) /3)  Returns the corresponding
*                   codeword lengths.
*   (*) ncodes      INTEGER;  Should be set to zero when calling.
*                   Returns number of codewords generated.
*
* ROUTINES REQUIRED:
*       QUADWORD       - Generate zero/non-zero indication for 4
*                        integer values. (This file)
*
* AUTHOR:      Staffan Ericsson
*
* DATE CREATED: June 16, 1985
*
* MODIFIED BY:
*       S Ericsson July 25, 1985:  Generating the codewords to
*                  produce bit stream.
*
```

```
*     This is what we really want to do, if recursive functions
*     were available.
*
*     INTEGER FUNCTION QUADCODE (blk,bdim, level, code_len, cdim,
*    -           code_hist, bits, code_words, words, lengths, ncodes)
*     IMPLICIT NONE
*     INTEGER bdim, level, cdim, bits, blk(0:bdim-1, 0:2**level-1),
*    -           code_len(-cdim:cdim, 0:level),
*    -           code_hist(-cdim:cdim, 0:level),
*    -           code_words(-cdim:cdim, 0:level),
*    -           words(*), lengths(*), ncodes,
*    -           nextlev, nextsize,
*    -           QUADWORD, QUADCODE
*
*     IF (level .EQ. 0) THEN
*        QUADCODE = blk(0,0)
*     ELSE IF (level .GT. 0) THEN
*        nextlev = level - 1
*        nextsize = 2**nextlev
*        QUADCODE = QUADWORD (QUADCODE (blk(0,0), bdim, nextlev,
*    -                 code_len, cdim, code_hist, bits,
*    -                 code_words, words, lengths, ncodes),
*    -        QUADCODE (blk(nextsize,0), bdim, nextlev,
*    -                 code_len, cdim, code_hist, bits,
*    -                 code_words, words, lengths, ncodes),
*    -        QUADCODE (blk(0,nextsize), bdim, nextlev,
*    -                 code_len, cdim, code_hist, bits,
*    -                 code_words, words, lengths, ncodes),
*    -        QUADCODE (blk(nextsize,nextsize), bdim, nextlev,
*    -                 code_len, cdim, code_hist, bits,
*    -                 code_words, words, lengths, ncodes) )
*     ELSE
*        STOP 'QUADCODE --  level < 0'
*     END IF
*     IF (code_len (QUADCODE, level)  .NE.  0) THEN
*        ncodes = ncodes + 1
*        words(ncodes) = code_words (QUADCODE, level)
*        lengths(ncodes) = code_len (QUADCODE, level)
*        bits = bits + code_len (QUADCODE, level)
*     END IF
*     code_hist(QUADCODE,level) = code_hist(QUADCODE,level) + 1
*
*     RETURN
*     END
*
*     But in FORTRAN we write 4 almost identical functions:

********************  Top level function  **********************
      INTEGER FUNCTION QUADCODE (blk,bdim, level, code_len, cdim,
     -           code_hist, bits, code_words, words, lengths, ncodes)
      IMPLICIT NONE
      INTEGER bdim, level, cdim, bits, blk(0:bdim-1, 0:2**level-1),
     -           code_len(-cdim:cdim, 0:level),
     -           code_hist(-cdim:cdim, 0:level),
     -           code_words(-cdim:cdim, 0:level),
     -           words(*), lengths(*), ncodes,
     -           nextlev, nextsize,
     -           QUADWORD, QUADCODE2

IF (level .EQ. 0) THEN
         QUADCODE = blk(0,0)
      ELSE IF (level .GT. 0) THEN
         nextlev = level - 1
         nextsize = 2**nextlev
         QUADCODE = QUADWORD (QUADCODE2 (blk(0,0), bdim, nextlev,
```

```
                     code_len, cdim, code_hist, bits,
                     code_words, words, lengths, ncodes),
          QUADCODE2 (blk(nextsize,0), bdim, nextlev,
                     code_len, cdim, code_hist, bits,
                     code_words, words, lengths, ncodes),
          QUADCODE2 (blk(0,nextsize), bdim, nextlev,
                     code_len, cdim, code_hist, bits,
                     code_words, words, lengths, ncodes),
          QUADCODE2 (blk(nextsize,nextsize), bdim, nextlev,
                     code_len, cdim, code_hist, bits,
                     code_words, words, lengths, ncodes) )
      ELSE
        STOP 'QUADCODE -- level < 0'
      END IF
      IF (code_len (QUADCODE, level) .NE. 0) THEN
        ncodes = ncodes + 1
        words(ncodes) = code_words (QUADCODE, level)
        lengths(ncodes) = code_len (QUADCODE, level)
        bits = bits + code_len (QUADCODE, level)
      END IF
      code_hist(QUADCODE,level) = code_hist(QUADCODE,level) + 1

RETURN
      END

********************* Lower level function ***********************
      INTEGER FUNCTION QUADCODE2 (blk,bdim, level, code_len, cdim,
             code_hist, bits, code_words, words, lengths, ncodes)
      IMPLICIT NONE
      INTEGER bdim, level, cdim, bits, blk(0:bdim-1, 0:2**level-1),
             code_len(-cdim:cdim, 0:level),
             code_hist(-cdim:cdim, 0:level),
             code_words(-cdim:cdim, 0:level),
             words(*), lengths(*), ncodes,
             nextlev, nextsize,
             QUADWORD, QUADCODE3

IF (level .EQ. 0) THEN
        QUADCODE2 = blk(0,0)
      ELSE IF (level .GT. 0) THEN
        nextlev = level - 1
        nextsize = 2**nextlev
        QUADCODE2 = QUADWORD (QUADCODE3 (blk(0,0), bdim, nextlev,
                     code_len, cdim, code_hist, bits,
                     code_words, words, lengths, ncodes),
          QUADCODE3 (blk(nextsize,0), bdim, nextlev,
                     code_len, cdim, code_hist, bits,
                     code_words, words, lengths, ncodes),
          QUADCODE3 (blk(0,nextsize), bdim, nextlev,
                     code_len, cdim, code_hist, bits,
                     code_words, words, lengths, ncodes),
          QUADCODE3 (blk(nextsize,nextsize), bdim, nextlev,
                     code_len, cdim, code_hist, bits,
                     code_words, words, lengths, ncodes) )
      ELSE
        STOP 'QUADCODE2 -- level < 0'
      END IF
      IF (code_len (QUADCODE2, level) .NE. 0) THEN
        ncodes = ncodes + 1
        words(ncodes) = code_words (QUADCODE2, level)
        lengths(ncodes) = code_len (QUADCODE2, level)
        bits = bits + code_len (QUADCODE2, level)
      END IF
      code_hist(QUADCODE2,level) = code_hist(QUADCODE2,level) + 1

RETURN
      END
```

********************* Lower level function **********************
```
      INTEGER FUNCTION QUADCODE3 (blk,bdim, level, code_len, cdim,
-             code_hist, bits, code_words, words, lengths, ncodes)
      IMPLICIT NONE
      INTEGER bdim, level, cdim, bits, blk(0:bdim-1, 0:2**level-1),
-             code_len(-cdim:cdim, 0:level),
-             code_hist(-cdim:cdim, 0:level),
-             code_words(-cdim:cdim, 0:level),
-             words(*), lengths(*), ncodes,
-             nextlev, nextsize,
-             QUADWORD, QUADCODE4

IF (level .EQ. 0) THEN
        QUADCODE3 = blk(0,0)
      ELSE IF (level .GT. 0) THEN
        nextlev = level - 1
        nextsize = 2**nextlev
        QUADCODE3 = QUADWORD (QUADCODE4 (blk(0,0), bdim, nextlev,
-                     code_len, cdim, code_hist, bits,
-                     code_words, words, lengths, ncodes),
-             QUADCODE4 (blk(nextsize,0), bdim, nextlev,
-                     code_len, cdim, code_hist, bits,
-                     code_words, words, lengths, ncodes),
-             QUADCODE4 (blk(0,nextsize), bdim, nextlev,
-                     code_len, cdim, code_hist, bits,
-                     code_words, words, lengths, ncodes),
-             QUADCODE4 (blk(nextsize,nextsize), bdim, nextlev,
-                     code_len, cdim, code_hist, bits,
-                     code_words, words, lengths, ncodes) )
      ELSE
        STOP 'QUADCODE3 --  level < 0'
      END IF
      IF (code_len (QUADCODE3, level) .NE. 0) THEN
        ncodes = ncodes + 1
        words(ncodes) = code_words (QUADCODE3, level)
        lengths(ncodes) = code_len (QUADCODE3, level)
        bits = bits + code_len (QUADCODE3, level)
      END IF
      code_hist(QUADCODE3,level) = code_hist(QUADCODE3,level) + 1

RETURN
      END
```

********************* Lowest level function **********************
```
      INTEGER FUNCTION QUADCODE4 (blk,bdim, level, code_len, cdim,
-             code_hist, bits, code_words, words, lengths, ncodes)
      IMPLICIT NONE
      INTEGER bdim, level, cdim, bits, blk(0:bdim-1, 0:2**level-1),
-             code_len(-cdim:cdim, 0:level),
-             code_hist(-cdim:cdim, 0:level),
-             code_words(-cdim:cdim, 0:level),
-             words(*), lengths(*), ncodes,
-             nextlev, nextsize,
-             QUADWORD, QUADCODE3

IF (level .EQ. 0) THEN
        QUADCODE4 = blk(0,0)
      ELSE IF (level .GT. 0) THEN
        STOP 'QUADCODE -- Max nesting depth is 4'
      ELSE
        STOP 'QUADCODE4 --  level < 0'
      END IF
      IF (code_len (QUADCODE4, level) .NE. 0) THEN
        ncodes = ncodes + 1
        words(ncodes) = code_words (QUADCODE4, level)
        lengths(ncodes) = code_len (QUADCODE4, level)
        bits = bits + code_len (QUADCODE4, level)
```

```
      END IF
      code_hist(QUADCODE4,level) = code_hist(QUADCODE4,level) + 1

RETURN
      END
```

* quadword - generate zero/non-zero indication for 4 integer values;
*       output is between 0 and 15.
```
      INTEGER FUNCTION QUADWORD (n1, n2, n3, n4)
      IMPLICIT NONE
      INTEGER n1, n2, n3, n4

IF (n1.NE.0) THEN
        QUADWORD = 8
      ELSE
        QUADWORD = 0
      END IF
      IF (n2.NE.0)   QUADWORD = QUADWORD + 4
      IF (n3.NE.0)   QUADWORD = QUADWORD + 2
      IF (n4.NE.0)   QUADWORD = QUADWORD + 1

RETURN
      END
```

APPENDIX F

\*\*\*\*\*\*\*\*\*\*\*\*\*\*\*\*\*\*\*\*\*\*\* PicTel Corporation \*\*\*\*\*\*\*\*\*\*\*\*\*\*\*\*\*\*\*\*\*\*\*\*
*
*       PROPRIETARY AND COMPANY PRIVATE:  NOT FOR RELEASE
*
* MODULE:        SUBROUTINE QUAD_DECODE
*
* DESCRIPTION:   Perform decoding of one block of quadtree coded
*                information.
*
* PARAMETERS:
*       level           INTEGER  2-log of blocksize N
*       amp_dtable      INTEGER  Amplitude decoding table with 256
*                                entries; generated by subr. "create_codewords".
*       quad_dtable     INTEGER  Quadtree addressing decoding table,
*                                one for each level.
*       bdim            INTEGER  First dimension of "blk". Facilitates
*                                in-place computations.
*   (*) blk             INTEGER  (bdim,2\*\*level)  The 8x8 block should be
*                                set to zero when calling; returns the decoded
*                                information.
*
* ROUTINES REQUIRED:
*       UNCODE_VLC       - Decode variable length code word
*
* AUTHOR:     Staffan Ericsson
*
* DATE CREATED: July 25, 1985
*
* MODIFIED BY:
*
*
*       This is what we really want to do, if recursive functions
*       were available.
*
*       SUBROUTINE quad_decode (level, amp_dtable, quad_dtable, bdim,blk)
*       IMPLICIT NONE
*       INCLUDE 'CODES.CMN/LIST'
*       INTEGER bdim, level, blk(0:bdim-1, 0:2\*\*level-1),
*     -         amp_dtable(2,0:255,2), quad_dtable(2,0:255,level),
*     -         nextlev, nextsize, quadword,
*     -         UNCODE_VLC
*

```
*      IF (level .EQ. 0) THEN
*         blk(0,0) = UNCODE_VLC (amp_dtable, 8,2)
*      ELSE IF (level .GT. 0) THEN
*         nextlev = level - 1
*         nextsize = 2**nextlev
*         quadword = UNCODE_VLC (quad_dtable(1,0,level), 8,1)
*         IF (IAND(quadword,1) .NE. 0) THEN
*            CALL quad_decode (nextlev, amp_dtable, quad_dtable, bdim,
*      -                      blk(nextsize,nextsize))
*         END IF
*         IF (IAND(quadword,2) .NE. 0) THEN
*            CALL quad_decode (nextlev, amp_dtable, quad_dtable, bdim,
*      -                      blk(0,nextsize))
*         END IF
*         IF (IAND(quadword,4) .NE. 0) THEN
*            CALL quad_decode (nextlev, amp_dtable, quad_dtable, bdim,
*      -                      blk(nextsize,0))
*         END IF
*         IF (IAND(quadword,8) .NE. 0) THEN
*            CALL quad_decode (nextlev, amp_dtable, quad_dtable, bdim,
*      -                      blk(0,0))
*         END IF
*      ELSE
*         STOP 'QUAD_DECODE --  level < 0'
*      END IF
*
*      RETURN
*      END
*
*      But in FORTRAN we write 4 almost identical functions:

******************** Top level function ************************
       SUBROUTINE quad_decode (level, amp_dtable, quad_dtable, bdim,blk)
       IMPLICIT NONE
       INCLUDE 'CODES.CMN/LIST'
       INTEGER bdim, level, blk(0:bdim-1, 0:2**level-1),
      -        amp_dtable(2,0:255,2), quad_dtable(2,0:255,level+1),
* Dirty fix: "quad_dtable" is declared to have one extra table, so that
*     we can use the same routine on the bottom level although there
*     isn't really any quad_dtable available there.
      -        nextlev, nextsize, quadword,
      -        UNCODE_VLC IF (level .EQ. 0) THEN
          blk(0,0) = UNCODE_VLC (amp_dtable, 8,2)
       ELSE IF (level .GT. 0) THEN
          nextlev = level - 1
          nextsize = 2**nextlev
          quadword = UNCODE_VLC (quad_dtable(1,0,level), 8,1)
          IF (IAND(quadword,1) .NE. 0) THEN
             CALL quad_decode2 (nextlev, amp_dtable, quad_dtable, bdim,
      -                       blk(nextsize,nextsize))
          END IF
          IF (IAND(quadword,2) .NE. 0) THEN
             CALL quad_decode2 (nextlev, amp_dtable, quad_dtable, bdim,
      -                       blk(0,nextsize))
          END IF
          IF (IAND(quadword,4) .NE. 0) THEN
             CALL quad_decode2 (nextlev, amp_dtable, quad_dtable, bdim,
      -                       blk(nextsize,0))
          END IF
          IF (IAND(quadword,8) .NE. 0) THEN
             CALL quad_decode2 (nextlev, amp_dtable, quad_dtable, bdim,
      -                       blk(0,0))
```

```
              END IF
           ELSE
              STOP 'QUAD_DECODE --   level < 0'
           END IF RETURN
           END
********************* Lower level function ***********************
      SUBROUTINE quad_decode2 (level, amp_dtable, quad_dtable, bdim,blk)
      IMPLICIT NONE
      INCLUDE 'CODES.CMN/LIST'
      INTEGER bdim, level, blk(0:bdim-1, 0:2**level-1),
  -            amp_dtable(2,0:255,2), quad_dtable(2,0:255,level+1),
  -            nextlev, nextsize, quadword,
              UNCODE_VLC IF (level .EQ. 0) THEN
              blk(0,0) = UNCODE_VLC (amp_dtable, 8,2)
           ELSE IF (level .GT. 0) THEN
              nextlev = level - 1
              nextsize = 2**nextlev
              quadword = UNCODE_VLC (quad_dtable(1,0,level), 8,1)
              IF (IAND(quadword,1) .NE. 0) THEN
                 CALL quad_decode3 (nextlev, amp_dtable, quad_dtable, bdim,
                              blk(nextsize,nextsize))
  -           END IF
              IF (IAND(quadword,2) .NE. 0) THEN
                 CALL quad_decode3 (nextlev, amp_dtable, quad_dtable, bdim,
                              blk(0,nextsize))
  -           END IF
              IF (IAND(quadword,4) .NE. 0) THEN
                 CALL quad_decode3 (nextlev, amp_dtable, quad_dtable, bdim,
                              blk(nextsize,0))
  -           END IF
              IF (IAND(quadword,8) .NE. 0) THEN
  -              CALL quad_decode3 (nextlev, amp_dtable, quad_dtable, bdim,
                              blk(0,0))
  -           END IF
           ELSE
              STOP 'QUAD_DECODE2 --   level < 0'
           END IF

RETURN
           END

********************* Lower level function ***********************
      SUBROUTINE quad_decode3 (level, amp_dtable, quad_dtable, bdim,blk)
      IMPLICIT NONE
      INCLUDE 'CODES.CMN/LIST'
      INTEGER bdim, level, blk(0:bdim-1, 0:2**level-1),
  -            amp_dtable(2,0:255,2), quad_dtable(2,0:255,level+1),
  -            nextlev, nextsize, quadword,
  -            UNCODE_VLC IF (level .EQ. 0) THEN
              blk(0,0) = UNCODE_VLC (amp_dtable, 8,2)
           ELSE IF (level .GT. 0) THEN
              nextlev = level - 1
              nextsize = 2**nextlev
              quadword = UNCODE_VLC (quad_dtable(1,0,level), 8,1)
              IF (IAND(quadword,1) .NE. 0) THEN
                 CALL quad_decode4 (nextlev, amp_dtable, quad_dtable, bdim,
                              blk(nextsize,nextsize))
  -           END IF
              IF (IAND(quadword,2) .NE. 0) THEN
                 CALL quad_decode4 (nextlev, amp_dtable, quad_dtable, bdim,
                              blk(0,nextsize))
```

```
              END IF
              IF (IAND(quadword,4) .NE. 0) THEN
                CALL quad_decode4 (nextlev, amp_dtable, quad_dtable, bdim,
                            blk(nextsize,0))
              END IF
              IF (IAND(quadword,8) .NE. 0) THEN
                CALL quad_decode4 (nextlev, amp_dtable, quad_dtable, bdim,
                            blk(0,0))
              END IF
            ELSE
              STOP 'QUAD_DECODE3 -- level < 0'
            END IF

RETURN
            END

************************ Lowest level function ************************
      SUBROUTINE quad_decode4 (level, amp_dtable, quad_dtable, bdim,blk)
      IMPLICIT NONE
      INCLUDE 'CODES.CMN/LIST'
      INTEGER bdim, level, blk(0:bdim-1, 0:2**level-1),
     -        amp_dtable(2,0:255,2), quad_dtable(2,0:255,level+1),
     -        nextlev, nextsize, quadword,
     -        UNCODE_VLC IF (level .EQ. 0) THEN
        blk(0,0) = UNCODE_VLC (amp_dtable, 8,2)
      ELSE IF (level .GT. 0) THEN
        STOP 'QUAD_DECODE4 -- Max nesting depth is 4'
      ELSE
        STOP 'QUAD_DECODE4 --  level < 0'
      END IF

RETURN
      END
```

APPENDIX G

```
********************* PicTel Corporation *************************
*
*       PROPRIETARY AND COMPANY PRIVATE:  NOT FOR RELEASE
*
* MODULE:        INTEGER FUNCTION UNCODE_VLC
*
* DESCRIPTION:   UNCODE_VLC decodes a variable length word and returns
*                the decoded value.
*
* PARAMETERS:
*       table    INTEGER (2, 2**bits, ntabs);  Decoding table containing
*                pairs of entries: the first is the decoded value,
*                the second is the codeword length. A negative length
*                indicates that the next decoding table shall be used,
*                and the absolute value indicates number of bits
*                to discard before entering the next table.
*       bits     INTEGER  Indicates size of decoding table
*       ntabs    INTEGER  Number of tables. Example: ntabs=2 indicates
*                that one extension table is available to handle the
*                decoding of words longer than "bits".
*
*
* ROUTINES REQUIRED:
*       UNCODE   - Extract bits from the bit stream 'codes'
*
* AUTHOR:        Staffan Ericsson
*
* DATE CREATED:  July 25, 1985
*
* MODIFIED BY:
*
```

```
INTEGER FUNCTION uncode_vlc (table, bits, ntabs)
IMPLICIT NONE
INTEGER bits, ntabs, table(2, 0:2**bits-1, ntabs)
INTEGER dpoint_save, codeword, length, itab
INCLUDE 'CODES.CMN/LIST' itab = 1
DO WHILE (itab .EQ. 1 .OR. length .LT. 0)
  dpoint_save = dpoint
  CALL uncode (codeword, bits)
  IF (itab .GT. ntabs) STOP 'UNCODE_VLC -- No code ext. available'
  uncode_vlc = table(1, codeword, itab)
  length = table(2, codeword, itab)
  IF (length .GE. 0) THEN
     dpoint = dpoint_save + length
  ELSE
     dpoint = dpoint_save - length
  END IF
  itab = itab + 1
END DO
RETURN
END
```

What is claimed is:

1. A method for encoding interframe error data, in an image transmission system, for transmitting a sequence of image frames, said method comprising the steps of decimating an interframe predicted image data for a current image frame for gnerating a prediction pyramid data structure having a plurality of decimation levels, decimating an uncoded current image data representing the uncoded current image frame for generating a current image pyramid data structure having said plurality of decimation levels, and applying hierarchical vector quantization encoding to said prediction and current image pyramid data structures on a level by level basis for generating an encoded data representation of the difference between the predicted image data and the uncoded current image data.

2. The method of claim 1 wherein said applying step comprises the steps of applying said herarchical encoding to said data structures on a block-by-block basis, and blurring blocks of the predicted image representation when a predicted image data fails to adequately represent a block portion of said current image at a pyramid structure level.

3. The method of claim 1 wherein said applying step comprises the step of employing arithmetic coding for generating, in part, said encoded representation.

4. The method of claim 1 further coomprising the step of applying said encoding to said data structures of a level on a block-by-blockbasis, and shifting block location boundaries from frame to frame of said sequence of image frames for improving the encoding efficiency.

5. The method of claim 1 wherein said applying step comprises the steps of subtracting, at a top level, the predicted image data structure from the current image data structure for generating a top level output image, forming a prediction interpolation error data structure at the lower levels by taking the difference between the predicted image data at the lower level and the interpolated predicted image data at the next higher level, and torming a prediction image at each lower level by ombining an interpolated output image of the next higher level with a prediction interpolation error dtat structure at the lower level.

6. The method of claim 5 wherein said prediction forming step further comprises the step of interpolating the output image from the next higher level for generating said interpolated output image.

7. The method of claim 5 further comprising the step of applying said vector quantization and coding only to the prediction image error at a bottom plurality of levels of the pyramid data structures, transmitting only blur information at the next to highest level, and transmitting only a scalar quantization data at the top level of processing.

8. An apparatus for encoding interframe error data in an image transmission system for transmitting a sequence of image frames, said apparatus comprising means for decimating an interframe predicted image data for a current image frame for generating a prediction pyramid data structure having a plurality of decimation levels, means for decimating an uncoded current image data representing the uncoded current image frame for generating a current image pyramid data structure having said plurality of decimation levels. and means for applying a hierarchical vector quantization encoding to said prediction and current image pyramid data structures on a level by level basis for generating an encoded data representation of the difference between the predicted image data and the encoded current image data.

9. The apparatus of claim 8 wherein said applying means further comprises means for applying said hierarchical encoding to said data structures on a block-by-block basis. and means for blurring blocks of the predicted image representation when a predicted image data fails to adequately represent a block portion of said current image at a pyramid structure level.

10. The apparatus of claim 8 wherein said applying means further comprises arithmetic coding means for generating, in part, said encoded representation.

11. The apparatus of claiam 8 further comprising
means for applying said coding to said data structures of a level on a block-by-block basis, and
means for shifting block location boundaries from frame to frame of said sequence of image frames for improbing encoding efficiency.

12. The apparatus of claim 8 wherein said applying means comprises
means for subtracting, at a top level, the predicted image data structure from the current image data structure for generating a top level output image,
means for forming a prediction interpolation error data structure at the lower levels by taking the difference between the predicted image data at the lower level and the interpolated predicted image data at the next higher level, and
means for forming a prediction image at each lower level by combining an interpolated output image of the next higher level with a prediction interpolation error data structure at the lower level.

13. A method for encoding interframe error data, in a motion compensation image transmission system, for transmitting a sequence of image frames, said method comprising the steps of
decimating an interframe predicted image data for a current image frame for generating a prediction pyramid data structure having a plurality of decimation levels,
decimating an uncoded current image data representing the uncoded current image frame for generating a current image pyramid data structure having said plurality of decimation levels, and
applying hierarchical vector quantization encoding to said prediction and current image pyramid data structures on a level by level basis for generating an encoded data representation of the difference between the predicted image data and the uncoded current image data.

14. The method of claim 13 wherein said applying step comprises the steps of
applying said hierarchical encoding to said data structures on a block-by-block basis, and
blurring blocks of the predicted image representation when a predicted image data fails to adequately represent a block portion of said current image at a pyramid structure level.

15. The method of claim 13 wherein said applying step comprises the step of
employing arithmetic coding for generating, in part, said encoded representation.

16. The method of claim 13 further comprising the step of
applying said encoding to said data structures of a level on a block-by-block basis, and
shifting block location boundaries from frame to frame of said sequence of image frames for improving the encoding efficiency.

17. The method of claim 13 wherein said applying step comprises the steps of
subtracting, at a top level, the predicted image data structure from the current image data structure for generating a top level output image,
forming a warped interpolation error data structure at the lower levels by taking the difference between the predicted image data at the lower level and the interpolated predicted image data at the next higher level, and
forming a prediction image at each lower level by combining an interpolated output image of the next higher level with a warped interpolation error data structure at the lower level.

18. The method of claim 17 wherein said prediction forming step further comprises the step of
interpolating the output image from the next higher level for generating said interpolated output image.

19. The method of claim 17 further comprising the step of
applying said vector quantization and coding only to the prediction image error at a bottom plurality of levels of the pyramid data structures,
transmitting only blur information at the next to highest level, and
transmitting only a scalar quantization data at the top level of processing.

20. An apparatus for encoding interframe error data in a motion compensation image transmission system for transmitting a sequence of image frames, said apparatus comprising
means for decimating an interframe predicted image data for a current image frame for generating a prediction pyramid data structure having a plurality of decimation levels,
means for decimating an uncoded current image data representing the uncoded current image frame for generating a current image pyramid data structure having said plurality of decimation levels, and
means for applying a hierarchical vector quantization encoding to said prediction and current image pyramid data structures on a level by level basis for generating an encoded data representation of the difference between the predicted image data and the encoded current image data.

21. The arraratus of claim 20 wherein said applying means further comprises
means for applying said hierarchical encoding to said data structures of a block-by-block basis, and
means for blurring blocks of the predicted image representation prior to generating said difference when a predicted image data fails to adequately represent a block portion of said current image.

22. The apparatus of claim 20 wherein said applying means further comprises
arithmetic coding means for generating, in part, said encoded representation.

23. The apparatus of claim 20 further comprising
means for applying said coding to said data structures of a level on a block-by-block basis, and
means for shifting block location boundaries from frame to frame of said sequence of image frames for improving encoding efficiency.

24. The apparatus of claim 20 wherein said applying means comprises
means for subtracting, at a top level, the predicted image data structure from the current image data structure for generating a top level output image,
means for forming a warped interpolation error data structure at the lower levels by taking the diference between the predicted image data at the lower level and the interpolated predicted image data at the next higher level, and
means for forming a prediction image at each lower level by combining an interpolated output image of the next higher level with a warped interpolation error data structure at the lower level.

25. A method for encoding interframe error data. in an image transmission system, for transmitting a sequence of image frames, said method comprising the steps of forming a difference image representing, on a pixel-by-pixel basis, the difference between a predicted image data for a current image frame and an uncoded current image data representing the uncoded current image frame, decimating said difference image for generating a difference image pyramid data structure having a plurality of decimation levels, and applying hierarchical vector quantization encoding to said difference image pyramid data structure on a level by level basis for generating an encoded data representation of the difference between the predicted image data and the uncoded current image data.

26. The method of claim 25 further comprising the step of forming said predicted image data using interframe motion compensation.

27. The method of claim 25 wherein said applying step comprises the steps of applying said hierarchical incoding to said data structures on a block-by-block basis, and blurring blocks of the predicted image representation prior to generating said difference when a predicted image data fails to adequately represent a block portion of said current image.

28. The method of claim 25 wherein said applying step comprises the step of employing arithmetic coding for generating, in part, said encoded representation.

29. The method of claim 25 further comprising the step of applying said encoding to said data structures of a level on a block-by-block basis, and shifting block location boundaries from frame to frame of said sequence of image frames for improving the encoding efficiency.

30. The method of claim 25 wherein said applying step comprises the step of forming an interpolation error data structure at the lower levels by taking the difference between the difference image data at the lower level and an interpolated reconstructed difference image data at the next higher level.

31. An apparatus for encoding interframe error data in an image transmission system for transmitting a sequence of image frames, said apparatus comprising means for forming a difference image representing, on a pixel-by-pixel basis, the difference between predicted image data for a current image frame and an uncoded current image data representing an uncoded current image frame, means for decimating said difference image for generating a difference image pyramid data structure having a plurality of decimation levels, and means for applying a hierarchical vector quantization encoding to said difference image pyramid data structure on a level by level basis for generating an encoded data representation of the difference between the predicted image data and the encoded current image data.

32. The apparatus of claim 31 further comprising
means for forming said predicted image data using interframe motion compensation.

33. The apparatus of claim 31 wherein said applying means further comprises means for applying said hierarchical encoding to said data structures on a block-by-block basis, and means for blurring blocks of the predicted image representation prior to generating said difference when a predicted image data fails to adequately represent a block portion of said current image.

34. The apparatus of claim 31 wherein said applying means further comprises arithmetic coding means for generating, in part, said encoded representation.

35. The apparatus of claim 31 further comprising means for applying said coding to said data structures of a level on a block-by-block basis, and means for shifting block location boundaries from frame to frame of said sequence of image frames for improving encoding efficiency.

36. The apparatus of claim 31 wherein said applying means comprises means for forming an interpolation error data structure at the lower levels by taking the difference between the difference image data at the lower level and an interpolated reconstructed difference image data at the next higher level.

37. A method for encoding interframe error data, in an image transmission system, for transmitting a sequence of image frames, said method comprising the steps of decimating an interframe predicted image data for a current image frame for generating a prediction pyramid data structure having a plurality of decimation levels, decimating an uncoded current image data representing the uncoded current image frame for generating a current image pyramid data structure having said plurality of decimation levels, and applying lossy compression hierarchical encoding to said prediction and current image pyramid data structures on a level by level basis for generating an encoded data representation of the difference between the predicted image data and the uncoded current image data, said applying step including the step of interpolating, for at least one lower level, image data from a higher level.

38. The method of claim 37 further comprising the step of forming said interframe predicted image data using interframe motion compensation.

39. The method of claim 37 wherein said applying step comprises the steps of applying said hierarchical encoding to said data structures on a block-by-block basis, and blurring blocks of the predicted image representation when a predicted image data fails to adequately represent a block portion of said current image at a pyramid structure level.

40. The method of claim 37 wherein said applying step comprises the step of employing arithmetic coding for generating, in part, said encoded representation.

41. The method of claim 37 wherein said applying step comprises the steps of subtracting, at a top level, the predicted image data structure form the current image data structure for generating a top level output image, forming a prediction interpolation error data structure at the lower levels by taking the difference between the predicted image data at the lower level and the interpolated predicted image data at the next higher level, and forming a prediction image at each lower level by combining an interpolated output image of the next higher level with a prediction interpolation error data structure at the lower level.

42. The method of claim 41 wherein said prediction forming step further comprises the step of interpolating the output image from the next higher level for generating said interpolated output image.

43. An apparatus for encoding interframe error data in an image transmission system for transmitting a sequence of image frames, said apparatus comprising means for decimating an interframe predicted image data for a current image frame for generating a prediction pyramid data structure having a plurality of decimation levels, means for decimating an uncoded current image data representing the uncoded current image frame for generating a current image pyramid data structure having said plurality of decimation levels, and means for applying lossy compression hierarchical encoding to said prediction and current image pyramid data structures on a level by level basis for generating an encoded data representation of the difference between the predicted image data and the encoded current image data, said applying means comprising means for interpolating, for at least one lower level, image data from a higher level.

44. The apparatus of claim 43 further comprising means for forming said interframe predicted image data using interframe motion compensation.

45. The apparatus of claim 44 wherein said applying means further comprises means for applying said hierarchical encoding to said data structures on a block-by-block basis, and means for blurring blocks of the predicted image representation when a predicted image data fails to adequately represent a block portion of said current image at a pyramid structure level.

46. The apparatus of claim 43 wherein said applying means further comprises arithmetic coding means for generating, in part, said encoded representation.

47. The apparatus of claim 43 wherein said applying means comprises means for subtracting, at a top level, the predicted image data structure from the current image data structure for generating a top level output image, means for forming a prediction interpolation error data structure at the lower levels by taking the difference between the predicted image data at the lower level and the interpolated predicted image data at the next higher level, and means for forming a prediction image at each lower level by combining an interpolated ouput image of the next higher level with a prediction interpolation error data structure at the lower level.

48. A method for encoding interframe error data, in an image transmission system, for transmitting a sequence of image frames, said method comprising the steps of forming a difference image representing, on a pixel-by-pixel basis, the difference between a predicted image data for a current image frame and an uncoded current image data representing the uncoded current image frame, decimating said difference image for generating a difference image pyramid data structure having a plurality of decimation levels, and applying lossy compression hierarchical encoding to said difference image pyramid data structure on a level by level basis for generating an encoded data representation of the difference between the predicted image data and the uncoded current image data, said applying step including the step of interpolating, for at least one lower level, image data from a higher level.

49. The method of claim 48 further comprising the step of forming said predicted image data using interframe motion compensation.

50. The method of claim 48 wherein said applying step comprises the steps of applying said hierarchical encoding to said data structures on a block-by-block basis, and blurring blocks of the predicted image representation prior to generating said difference when a predicted image data fails to adequately represent a block portion of said current image.

51. The method of claim 48 wherein said applying step comprises the steps of employing arithemtic coding for generating, in part, said encoded representation.

52. The method of claim 48 wherein said applying step comprises the step of forming an interpolation error data structure at the lower levels by taking the difference between the difference image data at the lower level and an interpolated reconstructed difference image data at the next higher level.

53. An apparatus for encoding interframe error data in an image transmission system for transmitting a sequence of image frames, said apparatus comprising means for forming a difference image representing, on a pixel-by-pixel basis, the difference between a predicted image data for a current image frame and an uncoded current image data representing an uncoded current image frame, means for decimating said difference image for generating a difference image pyramid data structure having said plurality of decimation levels, and means for applying a lossy compression hierarchical encoding to said difference image pyramid data structure on a level by level basis for generating an encoded data representation of the difference between the predicted image data and the encoded current image data, said applying means comprising means for interpolating, for at least one lower level, image data from a higher level.

54. The apparatus of claim 53 further comprising means for forming said predicted image data using interframe motion compensation.

55. The apparatus of claim 53 wherein said applying means further comprises means for applying said hierarchical encoding to said data structures on a block-by-block basis, and means for blurring blocks of the predicted image representation prior to generating said difference when a predicted image data fails to adequately represent a block portion of said current image at a pyramid structure level.

56. The apparatus of claim 53 wherein said applying means further comprises arithmetic coding means for generating, in part, said encoded representation.

57. The apparatus of claim 53 wherein said applying means comprises
means for forming an interpolation error data structure at the lower levels by taking the difference between the difference image data at the lower level and an interpolated reconstructed difference image data at the next higher level.

58. A method for encoding data represented as a multi-dimensional array of data values comprising the steps of
quantizing said data values by applying gain/shape vector quantization coding, and
deleting all small non-zero values having a zero value for each of its neighbors.

59. The method of claim 58 further comprising the step of
generating said data values for representing image data in an image transmission system, said rray being a two dimensional array and having eight nearest neighbors.

60. The method of claim 59 further comprising the step of
motion compensating said image transmission system for transmitting a sequence of images over a communications path.

61. A method for encoding image data represented as an array of data values comprising the steps of
applying gain/shape vector quantization to blocks of said array of data values for encoding said values,
transmitting the gain/shape code words for each non-zero block over a channel path to a receiver, and
varying the size of a shape code book for said vector quantization as a function of the gain associated with the shape.

62. The method of claim 61 further comprising the step of
generating said image data using a motion-compensated image system.

63. The method of claim 61 wherein said image data represents a multidimensional array of data values.

64. The method for encoding interframe image data, in an image transmission system, for transmitting a sequence of image frames, said method comprising the steps of
applying vector quantization encoding to said image data on a block-by-block basis, and
shifting block location boundaries from frame to frame of said sequence of image frames for improving encoding efficiency.

65. The method of claim 64 wherein said shifting step comprises the step of
shifting said block boundaries a plurality of picture elements in each of a plurality of axial directions defining an image plane.

66. An apparatus for encoding interframe image data, in an image transmission system, for transmitting a sequence of image frames, said apparatus comprising
means for applying vector quantization encoding to said image data on a block-by-block basis, and
means for shifting block location boundaries from frame to frame of said sequence of image frames for improving encoding efficiency.

67. The apparatus of claim 66 wherein said shifting means comprises
means for shifting said block boundaries a plurality of picture elements in each of a plurality of axial directions defining an image plane.

* * * * *

UNITED STATES PATENT AND TRADEMARK OFFICE
CERTIFICATE OF CORRECTION

PATENT NO. : 4,849,810
DATED : July 18, 1989
INVENTOR(S) : S. Staffan Ericsson

It is certified that error appears in the above—identified patent and that said Letters Patent is hereby corrected as shown below:

In References Cited, "Townsend 3,413,912" should be --Townsend 3,413,412--

In column 16, at line 54, "1,2,D" should be --1,2,...,D--

In column 19, 15 line 8, "whileffor" should be --while for--

In column 19, at line 38, "vector v" should be --vector $\underline{v}$--

In column 19, at line 38, after "location" insert --$\underline{p}$--

In column 19, at line 45

"$v^{i+1} = v^i - 2e \sum_p [g(p) - f(p-v^i)] \nabla (\cdot) f(p-v^i)$" should be --$\underline{v}^{i+1} = \underline{v}^i - 2e \sum_{\underline{p}} [g(\underline{p}) - f(\underline{p}-\underline{v}^i)] \nabla (\cdot) f(\underline{p}-\underline{v}^i)$--

In column 20, at line 24, "$3 \times 10^5$" should be --$3 \times 10^{-5}$--

In column 20, at line 68, "$V_o$" should be --$\underline{V}_o$--

In column 21, at line 3 (Equation 4), "$V_o = \sum_{j=1}^{4} a_j V_j$" should be --$\underline{V}_o = \sum_{j=1}^{4} a_j \underline{V}_j$--

In column 21, at line 6, "$V_j$" should be --$\underline{V}_j$--

In column 52, at line 1, "acc" should be --*vacc--

In column 83, at line 29 (claim 1), "gnerating" should be --generating--

UNITED STATES PATENT AND TRADEMARK OFFICE
CERTIFICATE OF CORRECTION

PATENT NO. : 4,849,810
DATED : July 18, 1989
INVENTOR(S) : S. Staffan Ericsson

It is certified that error appears in the above—identified patent and that said Letters Patent is hereby corrected as shown below:

In column 83, at line 44 (claim 2), "herarchical" should be --hierarchical--

In column 83, at line 54 (claim 4), "coomprising" should be --comprising--

In column 83, at line 57 (claim 4), "blockbasis" should be --block basis--

In column 84, at line 27 (claim 5), "ombining" should be --combining--

In column 84, at line 29 (claim 5), "dtat" should be --data--

In column 85, at line 8 (claim 11), "improbing" should be --improving--

In column 86, at line 60 (claim 24), "diference" should be --difference--

In column 87, at line 23 (claim 27), "incoding" should be --encoding--

In column 89, at line 48 (claim 47), "atop" should be --a top--

In column 91, at line 16 (claim 58), after "non-zero" insert --gain--

In column 91, at line 21 (claim 59), "rray" should be --array--

UNITED STATES PATENT AND TRADEMARK OFFICE
CERTIFICATE OF CORRECTION

PATENT NO. : 4,849,810
DATED : July 18, 1989
INVENTOR(S) : S. Staffan Ericsson

It is certified that error appears in the above—identified patent and that said Letters Patent is hereby corrected as shown below:

In column 92, at line 9 (claim 64), "The" should be --A--

Signed and Sealed this

Twenty-fifth Day of June, 1991

*Attest:*

HARRY F. MANBECK, JR.

*Attesting Officer*  *Commissioner of Patents and Trademarks*